United States Patent
Jiang et al.

(10) Patent No.: US 10,776,924 B2
(45) Date of Patent: Sep. 15, 2020

(54) METHOD AND SYSTEM FOR CARDIAC IMAGE SEGMENTATION

(71) Applicant: SHANGHAI UNITED IMAGING HEALTHCARE CO., LTD., Shanghai (CN)

(72) Inventors: Luan Jiang, Shanghai (CN); Qiang Li, Shanghai (CN); Shan Ling, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

(21) Appl. No.: 16/372,526

(22) Filed: Apr. 2, 2019

(65) Prior Publication Data

US 2019/0228530 A1 Jul. 25, 2019

Related U.S. Application Data

(63) Continuation of application No. 15/387,758, filed on Dec. 22, 2016, now Pat. No. 10,290,109.

(30) Foreign Application Priority Data

Dec. 22, 2015 (CN) .......................... 2015 1 0974234
Dec. 22, 2015 (CN) .......................... 2015 1 0974235

(51) Int. Cl.
G06T 7/12 (2017.01)

(52) U.S. Cl.
CPC ...... G06T 7/12 (2017.01); *G06T 2207/10088* (2013.01); *G06T 2207/30048* (2013.01)

(58) Field of Classification Search
None
See application file for complete search history.

(56) References Cited

U.S. PATENT DOCUMENTS

| 7,155,042 B1* | 12/2006 | Cowan | A61B 5/055 |
| | | | 382/128 |
| 8,050,478 B2* | 11/2011 | Li | G06T 7/149 |
| | | | 382/128 |

(Continued)

FOREIGN PATENT DOCUMENTS

| CN | 101625756 A | 1/2010 |
| CN | 103340628 A | 10/2013 |

(Continued)

OTHER PUBLICATIONS

Roger, V. L. et al., Heart disease and stroke statistics—2011 update: a report from the American Heart Association, Circulation 123(4): e18-e209 (2011).

(Continued)

*Primary Examiner* — Gandhi Thirugnanam
(74) *Attorney, Agent, or Firm* — Metis IP LLC

(57) ABSTRACT

A system and method for cardiac image segmentation are provided. A plurality of slice images of a myocardium of a left ventricle at a plurality of time phases in a cardiac cycle may be obtained. An end-diastolic phase may be determined. A first slice image at the end-diastolic phase may be retrieved. A region of interest (ROI) in the first slice image may be obtained. A blood pool region in the ROI may be segmented. The ROI may be transformed into a polar coordinate image. A dual dynamic programming operation may be performed on the polar coordinate image to determine endocardial and epicardial boundaries of the myocardium in the polar coordinate image. The polar coordinate image may be transformed into a Cartesian coordinate image to obtain the endocardial and epicardial boundaries of the myocardium in the first slice image at the end-diastolic phase.

20 Claims, 11 Drawing Sheets

(56) References Cited

U.S. PATENT DOCUMENTS

| | | | |
|---|---|---|---|
| 9,314,161 B2* | 4/2016 | Wang | A61B 5/0044 |
| 9,949,643 B2 | 4/2018 | Garnavi et al. | |
| 9,962,087 B2 | 5/2018 | Garnavi et al. | |
| 10,290,109 B2* | 5/2019 | Jiang | G06T 7/12 |
| 2007/0253609 A1* | 11/2007 | Aben | G06T 7/11 |
| | | | 382/128 |
| 2008/0267482 A1* | 10/2008 | Abe | A61B 8/08 |
| | | | 382/131 |
| 2010/0158332 A1* | 6/2010 | Rico | A61B 5/4312 |
| | | | 382/128 |
| 2010/0215238 A1* | 8/2010 | Lu | G06T 7/12 |
| | | | 382/131 |
| 2010/0303328 A1* | 12/2010 | Ciofolo | G06T 7/12 |
| | | | 382/131 |
| 2011/0044518 A1* | 2/2011 | Crandall | G02B 21/002 |
| | | | 382/128 |
| 2013/0184570 A1* | 7/2013 | Wang | A61B 5/0044 |
| | | | 600/425 |
| 2014/0161331 A1* | 6/2014 | Cohen | A61B 34/10 |
| | | | 382/128 |
| 2015/0085322 A1* | 3/2015 | Masaru | G06K 15/1878 |
| | | | 358/3.21 |
| 2016/0110879 A1* | 4/2016 | Garnavi | G06T 7/20 |
| | | | 382/131 |
| 2017/0178285 A1* | 6/2017 | Jiang | G06T 7/12 |
| 2019/0228530 A1* | 7/2019 | Jiang | G06T 7/12 |

FOREIGN PATENT DOCUMENTS

| | | |
|---|---|---|
| CN | 103927732 A | 7/2014 |
| CN | 104978730 A | 10/2015 |

OTHER PUBLICATIONS

Nichols, M. et al., European cardiovascular disease statistics, European Heart Network and European Society of Cardiology (2012).

Keenan, N. G. et al., CMR of ventricular function, Echocardiography 24: 185-193 (2007).

Petitjean, C. and Dacher, J.-N., A review of segmentation methods in short axis cardiac MR images, Medical Image Analysis 15(2): 169-184 (2011).

Katouzian, A. et al., A new automated technique for left- and right-ventricular segmentation in magnetic resonance imaging, Conf. Proc. IEEE Eng. Med. Biol Soc. 1: 3074-3077 (2006).

Cousty, J. et al., Segmentation of 4D cardiac MRI: automated method based on spatio-temporal watershed cuts, Image and Vision Computing 28: 1229-1243 (2010).

Lynch, M., et al., Automatic segmentation of the left ventricle cavity and myocardium in MRI data, Comput. Biol. Med. 36(4): 389-407 (2006).

Heimann, T. and Meinzer, H.-P., Statistical shape models for 3D medical image segmentation: a review, Medical Image Analysis 13(4): 543-563 (2009).

Tavakoli, V. and Amini, A. A., A survey of shaped-based registration and segmentation techniques for cardiac images, Computer Vision and Image Understanding 117(9): 966-989 (2013).

Bai, W. et al., Multi-atlas segmentation with augmented features for cardiac MR images, Medical Image Analysis 19(1): 98-109 (2015).

Caroline Petitjean. et al., A review of segmentation methods in short axis cardiac MR images, Medical Image Analysis 15(2): 169-184 (2011).

Ying-Li Lu. et al., Automatic functional analysis of left ventricle in cardiac cine MRI, Quantitative Imaging in Medicine and Surgery 3(4): 200-209 (2013).

Huaifei Hu. et al., Hybrid segmentation of left ventricle in cardiac MRI using gaussian-mixture model and region dynamic programming, Magnetic Resonance Imaging 31(4): 575-584 (2013).

Qu, Huaijing. Et al., Based on active contour model and statistical features Edge extraction of intravascular ultrasound images, Chinese Journal of Image and Graphics Journal of Image and Graphics 10(8): 999-1004 (2005).

First Office Action in Chinese Application No. 201510974234.0 dated Dec. 2, 2019, 25 pages.

First Office Action in Chinese Application No. 201510974235.5 dated Nov. 5, 2019, 16 pages.

Second Office Action in Chinese Application No. 201510974235.5 dated Apr. 1, 2020, 17 pages.

* cited by examiner

800

Obtain a plurality of slice images of a myocardium of a left ventricle at a plurality of time phases in a cardiac cycle — 810

Determine an end-diastolic phase from the plurality of time phases — 820

Obtain a region of interest in each of the slice images at the end-diastolic phase — 830

Segment a blood pool region in the region of interest in each of the slice images at the end-diastolic phase — 840

Transform the region of interest with the blood pool region into a polar coordinate image — 850

Perform a dual dynamic programming operation on endocardial and epicardial boundaries of the myocardium in polar coordinate image at the end-diastolic phase — 860

Segment endocardium and epicardium of the myocardium in the slice images at the time phases other than the end diastolic phase based on segmentation of the endocardium and epicardium of the myocardium at the end-diastolic phase — 870

Transform the polar coordinate image into a Cartesian coordinate image to determine the endocardial and epicardial boundaries of the myocardium — 880

Select a $K^{th}$ slice image at a Lth time phase as a current time phase slice image $I_{KL}$ and select a $K^{th}$ slice image at a $(L-1)^{th}$ time phase as a prior time phase slice image $I_{K(L-1)}$ — 910

Transform the current time phase slice image $I_{KL}$ into a polar coordinate image $P_{KL}$ — 920

Determine a grey value distribution of slice images of the myocardium from the end-diastolic phase to the previous time phase — 930

Enhance $I_{KL}$ — 940

Transform the enhanced image into a polar coordinate image $P_{card}$ — 950

Perform a dual dynamic programming operation on the polar coordinate images $P_{KL}$ and $P_{card}$ to determine the endocardial and epicardial boundaries of the myocardium in the slice images in the polar coordinate images — 960

FIG. 9

ROI

BP

METHOD AND SYSTEM FOR CARDIAC IMAGE SEGMENTATION

CROSS-REFERENCE TO RELATED APPLICATIONS

This application is a continuation application of U.S. patent application Ser. No. 15/387,758, filed on Dec. 22, 2016, which claims priority to Chinese Application No. 201510974234.0, filed on Dec. 22, 2015, and Chinese Application No. 201510974235.5, filed on Dec. 22, 2015, the entire contents of each of which are hereby incorporated by reference.

TECHNICAL FIELD

The present disclosure generally relates to a method and system for image processing, and more particularly, a method and system for segmenting a left ventricle (LV) in medical images.

BACKGROUND

In recent years, cardiovascular diseases have become a leading cause of death all over the world; millions of people get the cardiovascular diseases and died. A cardiac function is an important indicator in the diagnosis of cardiovascular diseases. For example, quantitative analysis of global and regional measurements, such as ventricle volumes, ejection fraction, and wall thickness may help a radiologist improve the accuracy and efficiency of the heart function evaluation. A CAD scheme may be used for locating endocardial and epicardial boundaries of the left ventricle in 4D cardiac cine MR images.

However, there are great variations in gray-scale and gradient distributions in 4D cardiac magnetic resonance images of different patients, and a diversity of tissue adjacent to the epicardium of the left ventricle. Such variations may bring about difficulty in accurately detecting the epicardium and endocardium of the left ventricle.

Heart perfusion magnetic resonance imaging techniques are widely used in heart disease diagnosis. However, MR images may include distortion and/or artifacts, which may cause misdiagnosis.

Great variations may exist in gray-scale and gradient distributions in 4D cardiac magnetic resonance images, either obtained from a similar scanning region of different patients, or from different regions of a same patient. In addition, a simple threshold-based detection approach or gradient-based detection approach may be inadequate to accurately extract the left ventricle endocardium and epicardium, because of a variety of tissues adjacent to the epicardium of the left ventricle. A model-based detection approach may need a lot of training samples so as to obtain a satisfactory result suitable for automatic detection.

Thus, it is desirable to develop systems and methods for processing and correcting MR images, thereby improving the quality of cardiac MR images.

SUMMARY

The present disclosure relates to MRI. One aspect of the present disclosure relates to a method for image processing. The method may include one or more of the following operations.

One aspect of the present disclosure relates to a method for cardiac image segmentation. The method may include one or more of the following operations. A plurality of slice images of a myocardium of a left ventricle at a plurality of time phases in a cardiac cycle may be obtained. Based on at least one of the plurality of slice images, an end-diastolic phase from the plurality of time phases may be determined. From the plurality of slice images, a first slice image at the end-diastolic phase may be retrieved. A region of interest in the first slice image at the end-diastolic phase may be obtained. A blood pool region in the region of interest in the first slice image at the end-diastolic phase may be segmented. The region of interest in the first slice image at the end-diastolic phase may be transformed into a polar coordinate image. A dual dynamic programming operation may be performed on the polar coordinate image to determine endocardial and epicardial boundaries of the myocardium in the polar coordinate image. The polar coordinate image may be transformed into a Cartesian coordinate image to obtain the endocardial and epicardial boundaries of the myocardium in the first slice image at the end-diastolic phase.

Another aspect of the present disclosure may relate to a method for cardiac image segmentation. The method may include one or more of the following operations. A plurality of slice images of a myocardium of a left ventricle at a plurality of time phases in a cardiac cycle may be obtained. The plurality of time phases may include a first time phase of an end-diastolic phase and a second time phase different from the first time phase. Based on at least one of the plurality of slice images, the end-diastolic phase may be determined. From the plurality of slice images, a slice image corresponding to the first time phase and a slice image corresponding to the second time phase may be retrieved. A first region of interest in the slice image corresponding to the first time phase may be obtained. A first blood pool region in the first region of interest may be segmented. The first region of interest may be transformed into a first polar coordinate image. Based on a dual dynamic programming operation, endocardial and epicardial boundaries of the myocardium in the first polar coordinate image may be determined. A second region of interest in the slice image corresponding to the second time phase may be obtained. The second region of interest may be transformed into a second polar coordinate image. Endocardial and epicardial boundaries of the myocardium in the second polar coordinate image may be determined based on the segmentation of the endocardial and epicardial boundaries of the myocardium in the first polar coordinate image. The first polar coordinate image and the second polar coordinate image may be transformed into Cartesian coordinate images to obtain the endocardial and epicardial boundaries of the myocardium in the slice image corresponding to the first time phase and the slice image corresponding to the second time phase.

A further aspect of the present disclosure relates to a non-transitory computer readable medium including executable instructions. The instructions, when executed by at least one processor, may cause the at least one processor to effectuate a method for cardiac image segmentation.

A further aspect of the present disclosure relates to a system for cardiac image segmentation. The system may include at least one processor and instructions. The instructions, when executed by the at least one processor, may cause the at least one processor to effectuate a method for cardiac image segmentation. The system may further include a non-transitory computer readable medium including the instructions.

In some embodiments, the plurality of slice images may be acquired from scanning of the left ventricle at the plurality of time phases.

In some embodiments, the determination of the end-diastolic phase from the plurality of time phases may include one or more of the following operations. Mid-ventricular slice images at the plurality of time phases may be selected. An initial region of interest in each of the mid-ventricular slice images may be determined. A maximum intensity projection image of the initial region of interest for the mid-ventricular slice images may be obtained. A clustering operation may be performed on the maximum intensity projection image to obtain projection clusters. Based on the clustering operation, connection regions may be identified from the projection clusters. Roundness of each of the connection regions may be determined. A connection region with the largest roundness may be identified from the connection regions. A mean gray value of each of the mid-ventricular slice images in the connected region with the largest roundness may be determined. The end-diastolic phase may be determined based on a time phase corresponding to one of the mid-ventricular slice images with a maximum mean gray value.

In some embodiments, a center of the region of interest may coincide with a centroid of the connection region with the largest roundness. In some embodiments, a length of the region of interest may be longer than the length of a long axis of the connection region with the largest roundness.

In some embodiments, a region of interest in a mid-ventricular slice image at the end-diastolic phase may be obtained.

In some embodiments, Gamma correction may be performed on the region of interest in the mid-ventricular slice image at the end-diastolic phase to obtain a corrected image.

In some embodiments, to determine candidate areas may include one or more of the following operations. A Fuzzy c-means clustering operation may be performed on the corrected image to obtain clusters of areas. Brightness of each of the clusters may be determined. A cluster having the highest brightness may be identified among the clusters of areas. Areas belonging the cluster having the highest brightness may be designated as candidate areas.

In some embodiments, to segment a blood pool region may include one or more of the following operations. An overlapping area where the candidate area overlaps the connection region with the largest roundness for each of the candidate areas may be determined. The candidate area with the largest overlapping area among the determined overlapping areas as the blood pool region in the mid-ventricular slice image at the end-diastolic phase may be designated.

In some embodiments, to segment a blood pool region may include one or more of the following operations. A region of interest in a second slice image at the end-diastolic phase other than the mid-ventricular slice image at the end-diastolic phase may be obtained. A blood pool region in the region of interest in the second slice image at the end-diastolic phase may be segmented.

In some embodiments, the segmentation of the blood pool region in the region of interest in the second slice image at the end-diastolic phase other than the mid-ventricular slice image may include using the segmentation of the blood pool region in the mid-ventricular slice image at the end-diastolic phase as guidance.

In some embodiments, the segmentation of the blood pool region in the region of interest in the mid-ventricular slice image at the end-diastolic phase and the segmentation of the blood pool region in the region of interest of the second slice image at the end-diastolic phase may be performed in an order from the mid-ventricular slice image at the end-diastolic phase to an apical slice image at the end-diastolic phase.

In some embodiments, the segmentation of the blood pool region in the region of interest of the mid-ventricular slice image at the end-diastolic phase and the segmentation of the blood pool region in the region of interest in the second slice image at the end-diastolic phase may be performed in an order from the mid-ventricular slice image at the end-diastolic phase to a basal slice image at the end-diastolic phase.

In some embodiments, the endocardial and epicardial boundaries of the myocardium in the slice image corresponding to the first time phase or the slice image corresponding to the second time phase may be convex-hulled and smoothed.

In some embodiments, mid-ventricular slice images of the myocardium of the left ventricle at the plurality of time phases may be obtained.

In some embodiments, to obtain a plurality of slice images of the myocardium of the left ventricle may include one or more of the following operations. A first mid-ventricular slice image at the first time phase may be obtained. A second mid-ventricular slice image at the second time phase may be obtained. A third mid-ventricular slice image at a third time phase may be obtained. The first time phase, the second time phase, and the third time phase may be at an anti-chronological order in the plurality of time phases.

In some embodiments, the determination of the endocardial and epicardial boundaries of the myocardium may include one or more of the following operations. A third region of interest in the third mid-ventricular slice image may be obtained. A fourth region of interest in the first mid-ventricular slice image may be obtained. A fifth region of interest in the second mid-ventricular slice image may be obtained. The third region of interest may be transformed into a third polar coordinate image. The fourth region of interest may be transformed into a fourth polar coordinate image. The fifth region of interest may be transformed into a fifth polar coordinate image. Endocardial and epicardial boundaries of the myocardium in the fourth polar coordinate image may be determined. Endocardial and epicardial boundaries of the myocardium in the fifth polar coordinate image may be determined. Endocardial and epicardial boundaries of the myocardium in the third polar coordinate image may be determined based on the determination of the endocardial and epicardial boundaries of the myocardium in the fourth polar coordinate image and the fifth polar coordinate image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 8 illustrates a flowchart of an exemplary process 800 for segmenting the epicardium and the endocardium of a left ventricle according to some embodiments of the present disclosure;

FIG. 9 illustrates a flowchart of an exemplary process 900 for segmenting the endocardium and the epicardium of a left ventricle in the slice images at the time phases other than the end-diastolic phase according to some embodiments of the present disclosure;

DETAILED DESCRIPTION

Figure 1:
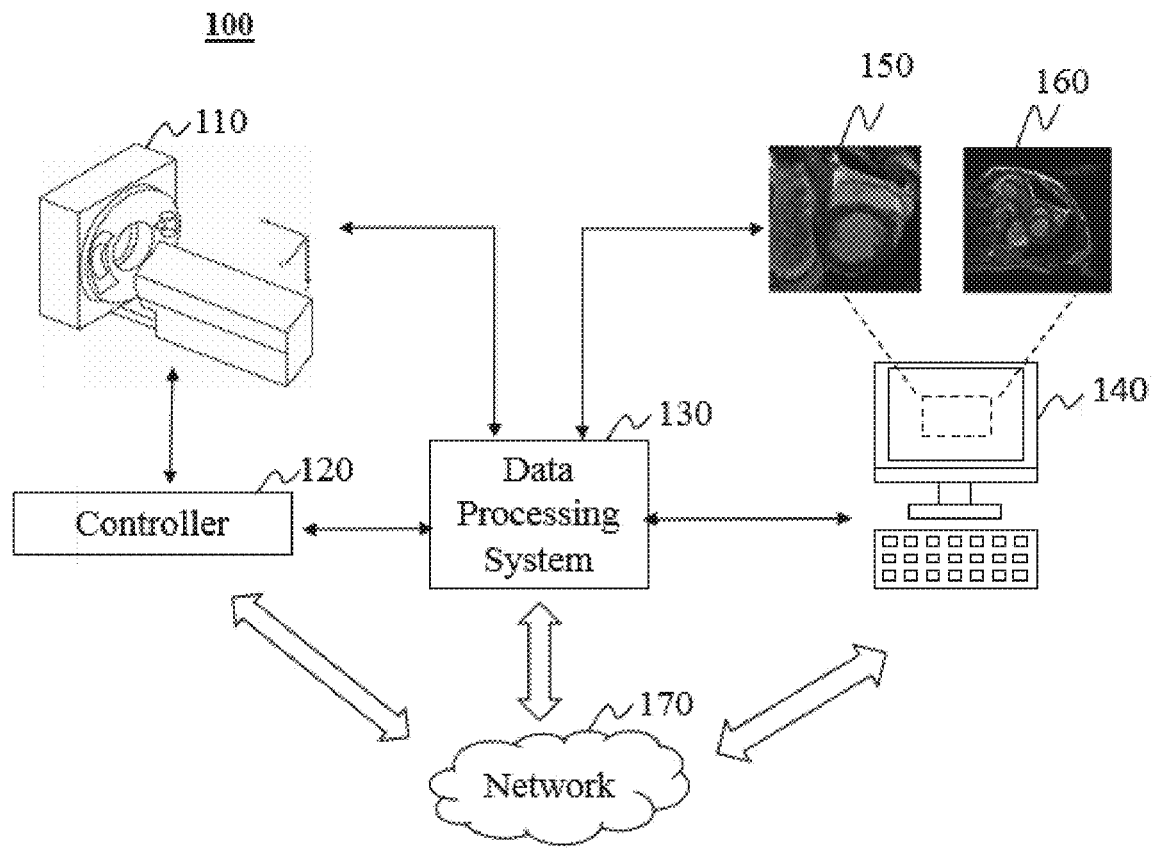
FIG. 1 illustrates a block diagram of an imaging system 100 according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

It will be understood that when a unit, engine, module or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The present disclosure relates to systems and methods for cardiac image segmentation. The cardiac image may be a MR image, a CT image, etc. According to some embodiments of the present disclosure, the method may include one or more of the following operations. A plurality of slice images of a myocardium of a left ventricle at a plurality of time phases in a cardiac cycle may be obtained. Based on at least one of the plurality of slice images, an end-diastolic phase from the plurality of time phases may be determined. From the plurality of slice images, a first slice image at the end-diastolic phase may be retrieved. A region of interest in the first slice image at the end-diastolic phase may be obtained. A blood pool region in the region of interest in the first slice image at the end-diastolic phase may be segmented. The region of interest in the first slice image at the end-diastolic phase may be transformed into a polar coordinate image. A dual dynamic programming operation may be performed on the polar coordinate image to determine endocardial and epicardial boundaries of the myocardium in the polar coordinate image. The polar coordinate image may be transformed into a Cartesian coordinate image to obtain the endocardial and epicardial boundaries of the myocardium in the first slice image at the end-diastolic phase.

Based on the method described herein, the cardiac image (e.g., a MR image) may be processed automatically without user intervention so that the blood pool region, the epicardium and/or the endocardium of a myocardium may be segmented automatically.

FIG. 1 illustrates an exemplary imaging system according to some embodiments of the present disclosure. An imaging system may produce an image of an object (e.g., a heart). As illustrated, the imaging system may include an imaging device 110, a controller 120, a data processing system 130, and an input/output device 140.

The imaging device 110 may scan an object and generate a plurality of data relating to the object. The imaging device 110 may further reconstruct an image from the plurality of data. In some embodiments, the imaging device 110 may be a medical imaging device, for example, a PET device, a SPECT device, a CT device, an MRI device, or the like, or any combination thereof (e.g., a PET-CT device, a PET-MRI device, or a SPECT-MRI device). In some embodiments, the imaging device 110 may include a scanner to scan an object and obtain information related with the object. In some embodiments, the imaging device 110 may be a radioactive scanning device. The radioactive scanning device may include a radioactive scanning source to emit radioactive rays to the object being scanned. The radioactive rays may include, for example, particle rays, photon rays, or the like, or any combination thereof. The particle rays may include neutron, proton, a-ray, electron, p-meson, heavy ion, or the like, or any combination thereof. The photon rays may include X-ray, y-ray, ultraviolet, laser, or the like, or any combination thereof. In some embodiments, the photon ray may be X-ray, and the imaging device 110 may be a CT system, a digital radiography (DR) system, a multi-modality system, or the like, or any combination thereof. Exemplary multi-modality system may include a computed tomography-positron emission tomography (CT-PET) system, a computed tomography-magnetic resonance imaging (SPECT-MRI) system, or the like.

The controller 120 may control the imaging device 110, the input/output device 140, and/or the data processing system 130. The controller 120 may receive information from or send information to the imaging device 110, the input/output device 140, and/or the data processing system 130. For example, the controller 120 may receive commands from the input/output device 140 provided by a user. As another example, the controller 130 may process data input by a user via the input/output unit 140 and transform the data into one or more commands. As still another example, the controller 120 may control the imaging device 110, the input/output device 140, and/or the data processing system 130 according to the received commands or transformed commands. As still another example, the controller 120 may receive image signals or data related to an object from the imaging device 110. As still another example, the controller 120 may send image signals or data to the data processing system 130. As still another example, the controller 120 may receive processed data or constructed image from the data processing system 130. As still another example, the controller 120 may send processed data or constructed image to the input/output device 140 for displaying. In some embodiments, the controller 120 may include a computer, a program, an algorithm, a software, a storage device, one or more interfaces, etc. Exemplary interfaces may include the interfaces of the imaging device 110, the input/output device 140, the data processing system 150, and/or other modules or units in the imaging system.

In some embodiments, the controller 120 may receive a command provided by a user including, for example, an imaging technician, a doctor, etc. Exemplary commands may relate to a scan time, a location of the object, the location of a couch on which the object lies, objection or a rotating speed of the gantry, a specific parameter relating to a threshold that may be used in the image reconstruction process, or the like, or any combination thereof. In some embodiments, the controller 120 may control the data processing system 130 to select different algorithms to process the raw data of an image.

The data processing system 130 may process information received from the imaging device 110, the controller 120, the network 170 and/or the input/output device 140. The data processing system 130 may deliver the images to the input/output device 140 for display. In some embodiments, the data processing system 130 may perform operations including, for example, data preprocessing, image reconstruction, image correction, image composition, image enhancement, image transformation, image segmentation, or the like, or any combination thereof. In some embodiments, the data processing system 130 may process data based on a technique including, for example, a clustering technique, a correction algorithm, a reconstruction technique, or the like, or any combination thereof. In some embodiments, image data regarding a myocardium may be processed in the data processing system 130.

In some embodiments, the data processing system 130 may generate a control signal relating to the configuration of the imaging device 110. In some embodiments, the result generated by the data processing system 130 may be provided to other modules or units in the system including, e.g., a database (not shown), a terminal (not shown) via the network 170. In some embodiments, the data from the data processing system 130 may be transmitted to a storage (not shown) for storing.

The input/output device 140 may receive or output information. In some embodiments, the input/output device 140 may include a keyboard, a touch screen, a mouse, a remote controller, or the like, or any combination thereof. The input and/or output information may include programs, software, algorithms, data, text, number, images, voices, or the like, or any combination thereof. For example, a user may input some initial parameters or conditions to initiate an imaging process. As another example, some information may be imported from an external resource including, for example, a floppy disk, a hard disk, a wired terminal, a wireless terminal, or the like, or any combination thereof. The output information may be transmitted to a display, a printer, a storage device, a computing device, or the like, or a combination thereof. In some embodiments, the input/output device 140 may include a graphical user interface. The graphical user interface may facilitate a user to input parameters, and intervene in the data processing procedure. In some embodiments, a slice image or a segmented slice image of a myocardium of a left ventricle may be displayed on the graphical user interface. For example, an image of a blood pool region 150 or a segmented endocardium and epicardium of the myocardium 160 may be displayed on the graphical user interface.

In some embodiments, the imaging device 110, the controller 120, the data processing system 130, the input/output device 140 may be connected to or communicate with each other directly. In some embodiments, the imaging device 110, the controller 120, the data processing system 130, the input/output device 140 may be connected to or communicate with each other via a network 170. In some embodiments, the imaging device 110, the controller 120, the data processing system 130, the input/output device 140 may be connected to or communicate with each other via an intermediate unit (not shown in FIG. 1). The intermediate unit may be a visible component or an invisible field (radio, optical, sonic, electromagnetic induction, etc.). The connection between different units may be wired or wireless. The wired connection may include using a metal cable, an optical cable, a hybrid cable, an interface, or the like, or any combination thereof. The wireless connection may include using a Local Area Network (LAN), a Wide Area Network (WAN), a Bluetooth, a ZigBee, a Near Field Communication (NFC), or the like, or any combination thereof. The network 170 that may be used in connection with the present system described herein are not exhaustive and are not limiting.

It should be noted that the above description about the imaging system is merely an example, and should not be understood as the only embodiment. To those skilled in the art, after understanding the basic principles of the connection between different units, the units and connection between the units may be modified or varied without departing from the principles. The modifications and variations are still within the scope of the current application described above. In some embodiments, these units may be independent, and in some embodiments, part of the units may be integrated into one unit to work together.

Figure 2:
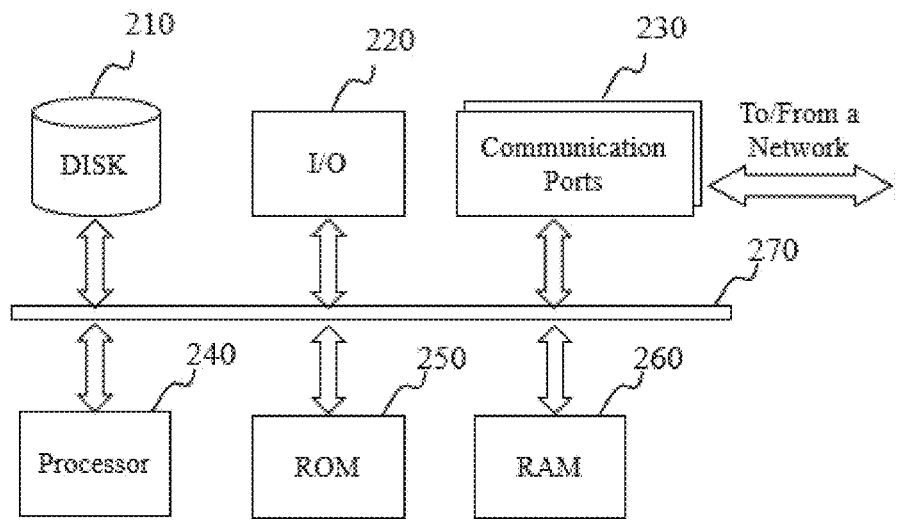
FIG. 2 illustrates an architecture of an exemplary computing device 200 according to some embodiments of the present disclosure.

FIG. 2 illustrates an exemplary architecture of a computing device 200 for image processing. Computing device 200 may be a general purpose computer or a special purpose computer, configured to perform the functions disclosed in this application. For example, image segmentation may be implemented on computing device 200, via its hardware, software program, firmware, or a combination thereof. Although only one such computer is shown, for convenience, the computer functions relating to image processing as described herein may be implemented in a distributed fashion on a number of similar platforms, to distribute the processing load.

Computing device 200, for example, may include a communication port 130 configured to facilitate communications between computing device 200 and other devices via, for example, a network (wired or wireless). Computing device 200 may also include a processor 240 configured to execute program instructions stored in a storage device (e.g., disk 210, ROM 250, and RAM 260) or a non-transitory computer-readable medium. When processor 240 executes the program instructions, computing device may be caused to perform one or more functions disclosed in this application. For example, processor 240 may performing one or more operations on MR images. The operations may include image manipulation (e.g., rotating, flipping, resizing, or cropping), image segmentation, image correction, image registration, image matching, image partition, image smoothing, or the like, or a combination thereof.

Processor 240 may include or is part of one or more known processing devices such as a microprocessor. In some embodiments, processor 240 may include any type of single or multi-core processor, mobile device microcontroller, central processing unit, etc.

Computing device 200 may further include an internal communication bus 270, program storage, and data storage of different forms, such as, disk 210, read only memory (ROM) 250, or random access memory (RAM) 260, for various data files to be processed and/or communicated by the computer, as well as possibly program instructions to be executed by processor 240. Computing device 200 may also include an I/O component 220, supporting input/output flows between the computing device 200 and other components therein such as user interface elements (not shown in figures). Computing device 200 may also receive programming and data via network communications.

Hence, aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as a main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution—e.g., an installation on an existing server. In addition, image processing and segmentation as disclosed herein may be implemented as a firmware, firmware/software combination, firmware/hardware combination, or a hardware/firmware/software combination.

Figure 3:
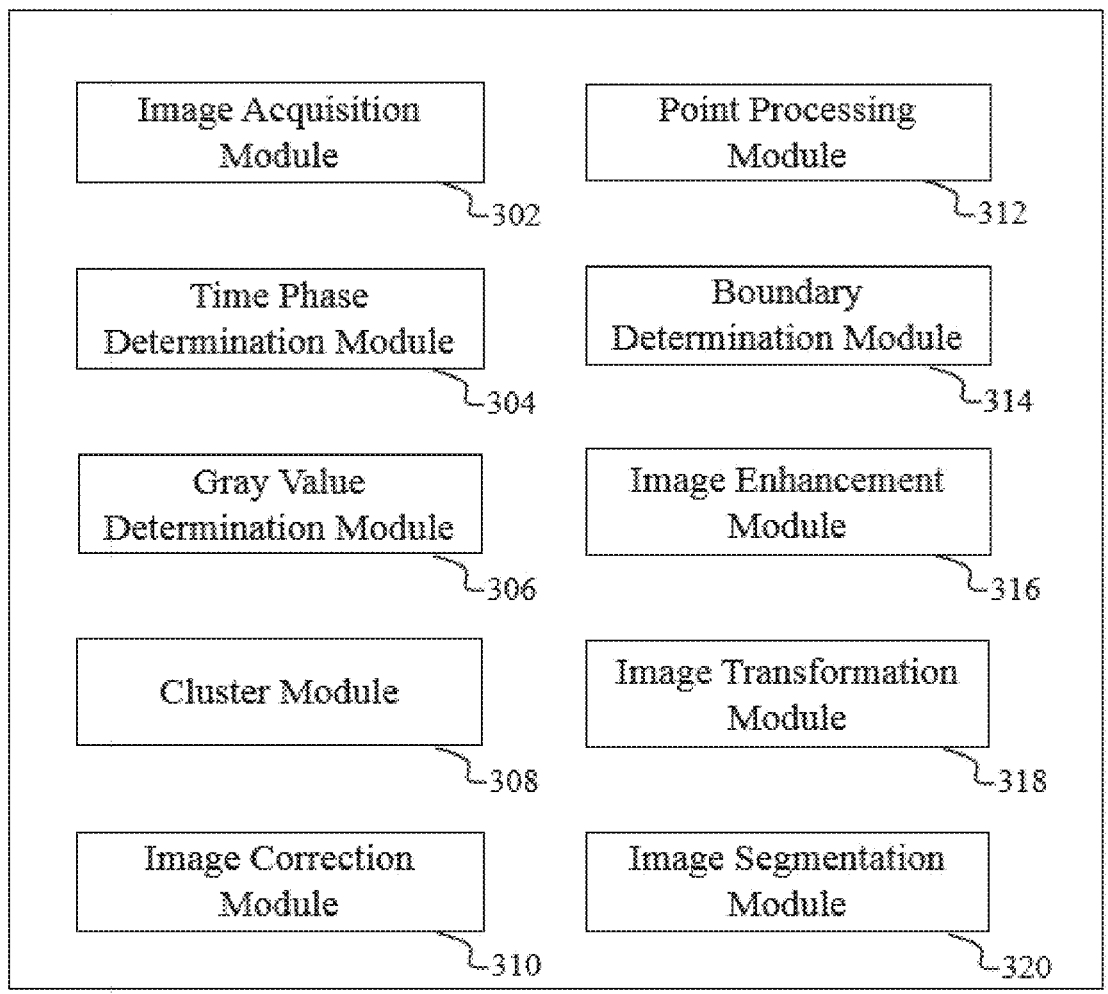
FIG. 3 illustrates a block diagram of an exemplary processor 300 according to some embodiments of the present disclosure.

FIG. 3 illustrates a block diagram of an exemplary processor 300 according to some embodiments of the present disclosure. The processor 300 may include an image acquisition module 302, a time phase determination module 304, a gray value determination module 306, a cluster module 308, an image correction module 310, a point processing module 312, a boundary determination module 314, an image enhancement module 316, an image transformation module 318, an image segmentation module 320, or other modules. In some embodiments, the modules may be independent. In some embodiments, part of the modules may be integrated into one module to work together.

The image acquisition module 302 may obtain an image of a myocardium of a (left) ventricle. In some embodiments, an image of the myocardium may be divided into a plurality of slices, and the image acquisition module 302 may obtain slice images of the myocardium. The plurality of slices may include a mid-ventricular slice of the myocardium. The mid-ventricular slice may refer to a slice in the middle of the (left) ventricular. The slice images may include one or more images of the mid-ventricular slice (also referred to herein as mid-ventricular slice images) at different time phases. In some embodiments, the image acquisition module 302 may obtain the image of the myocardium at different cardiac cycle. The cardiac cycle may refer to a duration from (left) ventricular systole to (left) ventricular diastole. A cardiac cycle may be divided into a number of time segments. The time segments may be discrete and/or consecutive. A time segment of the cardiac cycle may be referred to herein as a time phase. In some embodiments, the time phases may have a same length of time or different lengths of time. The number of time phases in a cardiac cycle may be a predetermined value between one and thirty. For instance, the number of time phases in the cardiac cycle may be five, ten, twenty, etc. In some embodiments, the image acquisition module 302 may obtain the image of the myocardium in each of the plurality of slices at each of the time phases. The plurality of time phases may include an end-diastolic phase. The end-diastolic phase may refer to the last time phase of the left ventricular diastole in a cardiac cycle. The image acquisition module 302 may obtain one or more slice images at the end-diastolic phase.

The time phase determination module 304 may determine the end-diastolic phase based on the slice images obtained by the image acquisition module 302. In some embodiments, the time phase determination module 304 may determine an initial region of interest in each of the mid-ventricular slice images from a plurality of slice images. The time phase determination module 304 may also determine a maximum intensity projection (MIP) image of the initial region of interest for the mid-ventricular slice images. The time phase determination module 304 may also obtain information from the gray value determination module 306 and the cluster module 308. Based on the information, the time phase determination module 304 may determine the end-diastolic phase.

The gray value determination module 306 may determine gray values of different regions in the slice images. In some embodiments, the gray value determination module 306 may also determine a gray value distribution of the slice images at some time phases. The gray value or gray value distribution may be transferred to other modules. For example, the gray values of different regions may be transferred to the time phase determination module 304 to determine the end-diastolic phase. As another example, the gray value distribution of the slice images may be transferred to image enhancement module 316 to enhance an image.

The cluster module 308 may perform a clustering operation on an image. The image may include a slice image, a region of interest in a slice image, a maximum intensity projection image, a corrected image obtained by correcting a slice image. The clustering operation may be based on a k-means clustering algorithm, a Fuzzy-c mean clustering algorithm, a hierarchical clustering algorithm, a Gaussian clustering algorithm, a minimal spamming tree (MST) based clustering algorithm, a kernel k-means clustering algorithm, a density based clustering algorithm, or the like. In some embodiments, after the clustering operation, the image may be divided into a predetermined number of clusters. The number of the clusters may be between two and ten. As one example, a corrected slice image may be divided into two clusters with different values of brightness. As another example, a maximum intensity projection image may be divided into more than one cluster with different values of brightness, e.g., two clusters, three clusters, four clusters, etc.

The image correction module 310 may correct a slice image to generate a corrected image based on a correction algorithm, e.g., Gamma correction. The corrected image may be transferred to the cluster module 308.

The point processing module 312 may process points (e.g., edge points/pixels of a blood pool region, points at radial lines). A region of interest may be scanned using a plurality of radial lines to segment a blood pool region. The radial lines may intersect with the edge of the blood pool region. In some embodiments, the point processing module 312 may extract an edge point from a radial line. An edge point may be away from the centroid of the blood pool region by a radial distance. In some embodiments, the point processing module 312 may further extract some edge points from all of the edge points. For example, the point processing module 312 may extract some edge points with the nearest radial distance. The number of the extracted edge points may be between one and one hundred. In some embodiments, the point processing module 312 may also remove one or more edge points. For instance, an edge point whose radial distance is larger than a threshold (e.g., a sum of the mean value and the standard deviation of the extracted edge points) may be removed. The extracted edge points or the remaining (or referred to as filtered) edge points may be transferred to the boundary determination module 314 to determine the boundary (edge) of the blood pool region.

The boundary determination module 314 may determine a region boundary based on, e.g., edge points. For instance, the boundary determination module 314 may determine the boundary of a blood pool region, the boundary of the endocardium of a myocardium, a boundary of the epicardium of a myocardium, etc. In some embodiments, the boundary determination module 314 may interpolate the extracted or filtered edge points determined by the point processing module 312. In some embodiments, the boundary determination module 314 may generate, by way of, e.g., fitting, a closed curve based on the extracted or filtered edge points and/or the points determined by way of the interpolation.

The image enhancement module 316 may enhance an image. The enhancement may be based on a gray value of the image and/or a gray value distribution associated with a plurality of related images. Merely by way of example, to obtain an enhanced image of a slice image of the myocardium of the left ventricle at a specific time phase, the image enhancement module 316 may retrieve a gray value distribution of slice images of the myocardium at several time phases, and then multiply the gray value of a pixel in the slice image at the specific time phase by the value of the gray value distribution corresponding to the gray value of the pixel to obtain the enhanced image. The enhanced image may be transferred to the image transformation module 318 or the image segmentation module 320.

The image transformation module 318 may transform a Cartesian coordinate image into a polar coordinate image. In some embodiments, the Cartesian coordinate image may include a slice image, an enhanced image of a slice image, or a region of interest in a slice image, or a region of interest of an enhanced image of a slice image, or the like. In some embodiments, the image transformation module 318 may transform a polar coordinate image into a Cartesian coordinate image.

The image segmentation module 320 may segment a region from an image. For instance, the image segmentation module 320 may segment a blood pool region from a slice image. As another example, the image segmentation module 320 may segment the endocardium and/or an epicardium of the myocardium. In some embodiments, the image segmentation module 320 may segment a blood pool region in one slice image based on a segmentation of a blood pool region in another slice image. In some embodiments, the image segmentation module 320 may segment the endocardium and/or the epicardium of a myocardium in the slice images at the time phases other than the end-diastolic phase based on the segmentation of the endocardium and/or the epicardium of the myocardium in the slice images at the end-diastolic phase.

For brevity, an image or a portion thereof corresponding to an object (e.g., an organ, a tissue, etc.) may be referred to as the object. For instance, a portion of a slice image of an endocardium may be referred to as an endocardium. As another example, the segmentation of a portion of the slice image of the endocardium may be referred to as the segmentation of the endocardium.

It should be noted that the above description about the processor 300 is merely an example, and should not be understood as the only embodiment. To those skilled in the art, after understanding the basic principles of the connection between different modules, the modules and connection between the modules may be modified or varied without departing from the principles. In some embodiments, these modules may be independent, and in some embodiments, part of the modules may be integrated into one module to work together. For example, the point processing module 312 and the boundary determination module 314 may be included in the image segmentation module 320. The modifications and variations are still within the scope of the current application described above.

Figure 4:
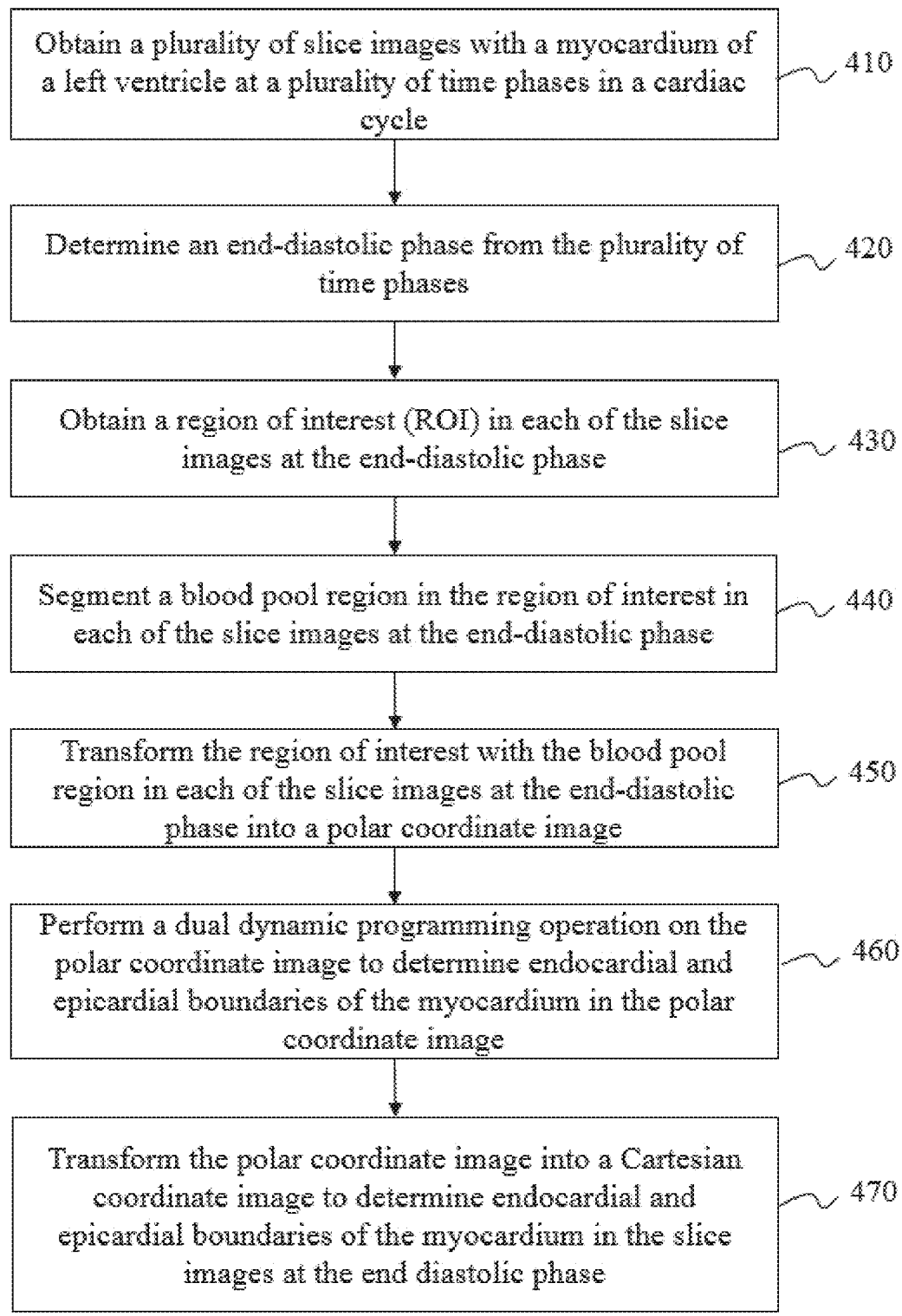
FIG. 4 illustrates a flowchart of an exemplary process 400 for segmenting the epicardium and the endocardium of a left ventricle in a slice image at an end-diastolic phase according to some embodiments of the present disclosure.

FIG. 4 illustrates a flowchart of an exemplary process 400 for segmenting the epicardium and the endocardium of a myocardium of a left ventricle in a slice image at an end-diastolic phase in accordance with some embodiments of the present disclosure. In some embodiments, at least part of process 400 may be performed by processor 240.

In 410, a plurality of slice images (MR images or CT images) of a left ventricle at a plurality of time phases in a cardiac cycle may be obtained. In some embodiments, the operation may be performed by the processor 240 (e.g., the image acquisition module 302). The plurality of slice images may contain or include a portion of a myocardium of a left ventricle. In some embodiments, the plurality of slice images may be MR images acquired by an MRI device or an MRI scanner. Alternatively or additionally, the plurality of slice images may be obtained by processor 240 (e.g., the image acquisition module 302). The slice images may be cardiac cine MR images IN of a left ventricle at different time phases. The parameter "N" denotes an ordinal number of the slices; and the parameter "P" denotes an ordinal number of the time phases. "N" and "P" may be integers. In some embodiments, "N" or "P" may be a predetermined value between one and thirty. For instance, "N" or "P" may be five, ten, twenty, etc.

Merely by way of example, in 410, each of the slice images may be acquired as follows: First, a plurality of magnetic resonance (MR) signals of the slices regarding to heart (cardiac area) may be acquired by the MR scanner. Merely by way of example, at each of a plurality of time phases, a number of slices of the heart (e.g., left ventricle) are excited and corresponding MR data lines are collected. The MR data lines may be filled in K-Space, and the slice images (e.g., MR images) of the slices may be obtained using a Fourier transform. In addition, a relative short time window may be preset at each of the time phases while the corresponding MR data lines are collected. Thus, motion artifacts caused by heart beat may be reduced, and quality of the slice images may be improved.

Figure 10A:
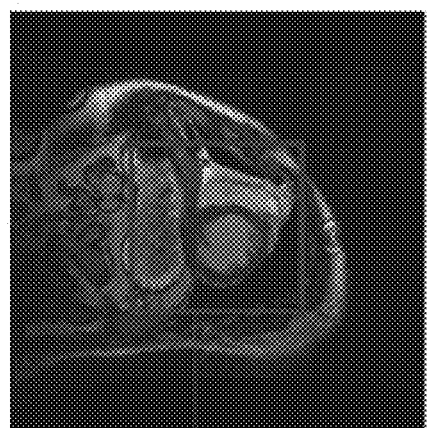
FIG. 10A illustrates an exemplary initial region of interest according to some embodiments of the present disclosure.

The left ventricle (with myocardium part) may be divided into several slices along a longitudinal axis. The longitudinal axis may pass through the cardiac area from the basal part of the cardiac area to the apical part of the cardiac area. Corresponding slice images (MR images, e.g. as shown in FIG. 10A) may be represented by $I_{NP}$. Furthermore, it may be presumed that an $M^{th}$ slice is located essentially at the mid-ventricular (middle ventricular) position. "M" is an integer larger than one.

Figure 5:
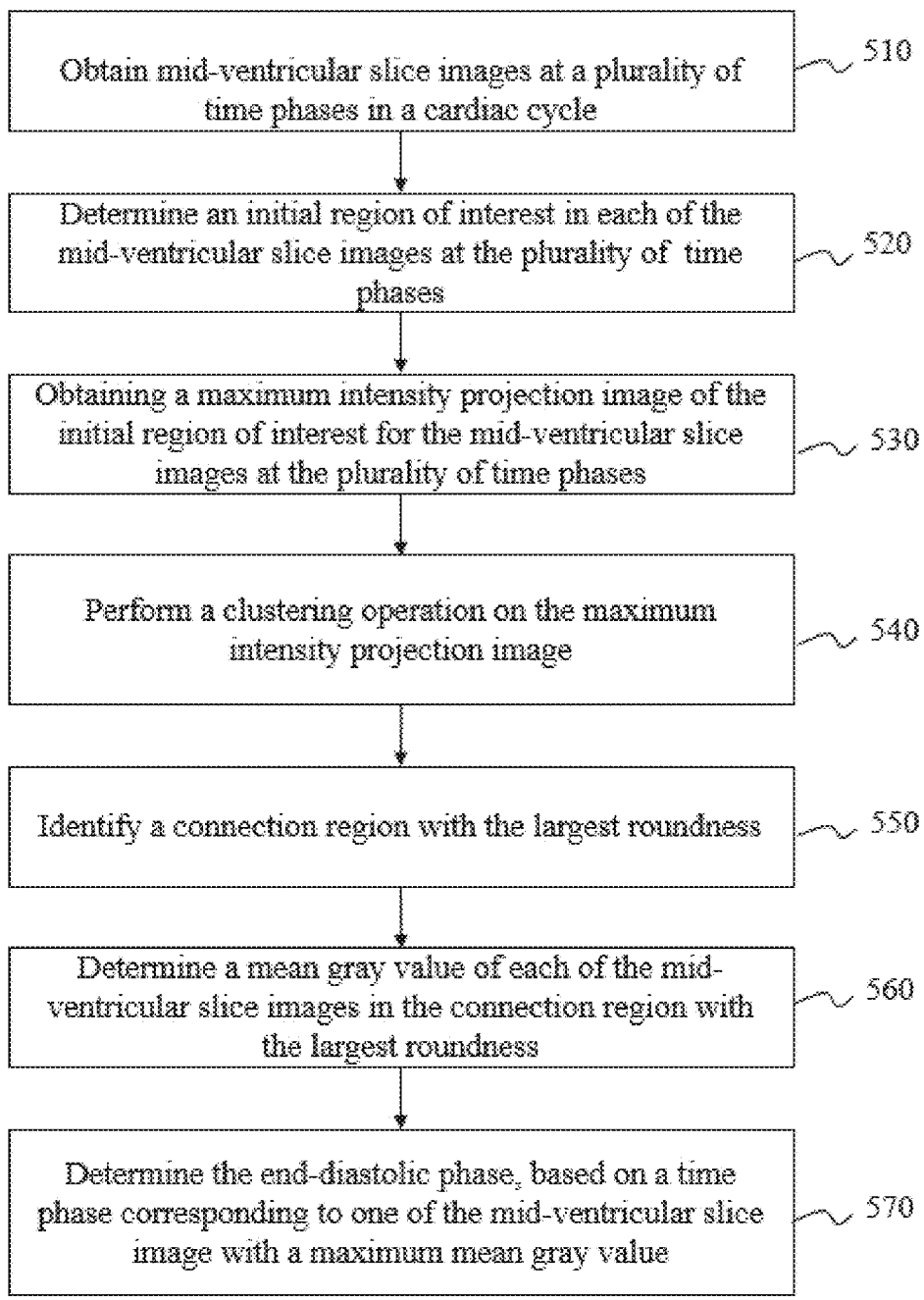
FIG. 5 illustrates a flowchart of an exemplary process 500 for determining the end-diastolic phase according to some embodiments of the present disclosure.

In 420, an end-diastolic phase may be determined. In some embodiments, the determination may be performed by processor 240 (e.g., the time phase determination module 304). In some embodiments, the slice images corresponding to an end-diastolic phase (also referred to as slice images at the end-diastolic phase) may be determined by the data processing system 130. FIG. 5 illustrates an exemplary process for determining the end-diastolic phase/period within a cardiac cycle.

In 430, a region of interest (ROI) in each of the slice images at the end-diastolic phase may be obtained. In some embodiments, the region of interest in each slice image may be determined. Merely by way of example, the region of interest (ROI) may have a shape of a square, a triangle, a rectangle, a parallelogram, a circle, etc. The ROI may have a center coinciding with the centroid of the largest roundness connection region (area "A") as described in connection with FIG. 5. The length of the ROI may be longer than the length of a long axis of the largest roundness connection region. As one example, the length of the ROI may be longer than the length of the long axis of the largest roundness connection region (area "A") by several pixels, e.g., between ten and fifty pixels. In some embodiments, the length of the ROI may be longer than the length of the long axis of the largest connection region (area "A") by five pixels, ten pixels, fifteen pixels, twenty pixels, twenty-five pixels, thirty pixels, thirty-five pixels, forty pixels, etc.

In 440, a blood pool region in the region of interest in each of the slice images at an end-diastolic phase may be segmented. In some embodiments, the segmentation of the blood pool region in the region of interest in each of the slice images at the end-diastolic phase may be performed by processor 240 (e.g., image segmentation module 320). In some embodiments, the segment of the blood pool region in 440 may be rough, and may be refined further.

In some embodiments, the slice images $I_{NP}(E_D)$ at the end-diastolic phase/period may be segmented in an order from the mid-ventricular slice image at the end-diastolic phase to an apical slice image at the end-diastolic phase or to a basal slice image at the end-diastolic phase. Therefore, a blood pool region of the left ventricle at the end-diastolic phase may be segmented and delineated. The apical slice image at the end-diastolic phase may refer to an image of a slice at the apex of the heart at the end-diastolic phase. The basal slice image at the end-diastolic phase may refer to an image of a slice at the base of the heart at the end-diastolic phase.

Figure 6:
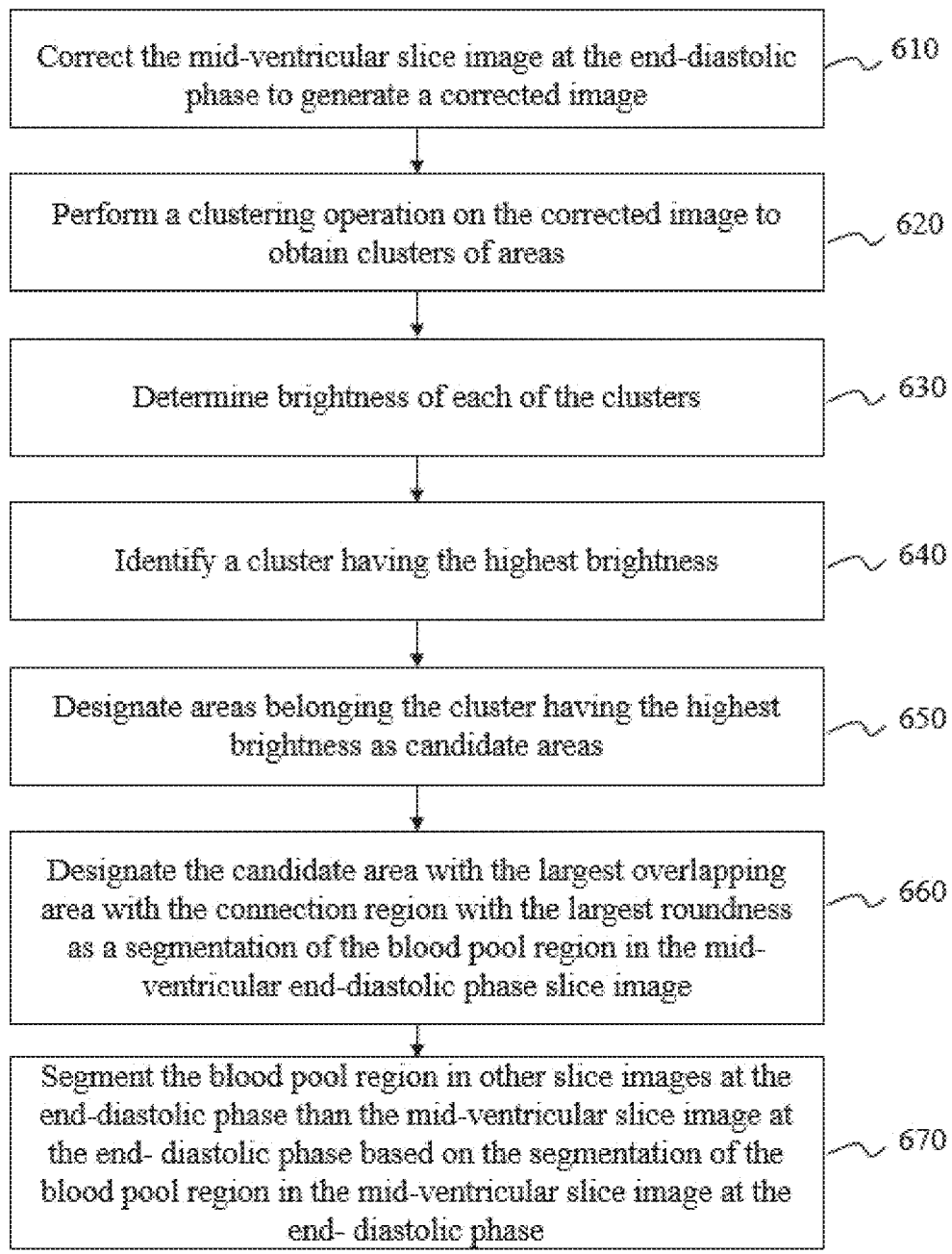
FIG. 6 illustrates a flowchart of an exemplary process 600 for segmenting a blood pool region according to some embodiments of the present disclosure.

FIG. 6 illustrates an exemplary process for segmenting the blood pool region in a mid-ventricular slice image at the end-diastolic phase In 450, the region of interest with the (segmented) blood pool region in each of the slice images at the end-diastolic phase may be transformed into a polar coordinate image. The transformation may be performed by the processor 240 (e.g., the image transformation module 318). The polar coordinate images may include X-coordinates and Y-coordinates. The X-coordinate may represent index numbers of radial lines originating from the centroid of the segmented blood pool region. The Y-coordinate may represent distances from points (pixels) on the radial lines to the origin of the radial lines (or the centroid of the segmented blood pool region). In some embodiments, the number of the radial lines may be any value between one hundred and two hundred. As one example, the number of the radial lines may be one hundred and eighty. The start point of scanning by a radial line may be an interior point inside the segmented blood pool region, e.g., a number of pixels (e.g. 5-15 pixels) from an edge point of the segmented blood pool region. The end point of scanning by the radial line may be an exterior point outside of the segmented blood pool region, e.g., a number of pixels (e.g., 15-45 pixels) from the edge point of the segmented blood pool region.

In 460, a dual dynamic programming operation may be performed on the polar coordinate images to determine endocardial and epicardial boundaries in the slice image at the end-diastolic phase. Each radial line (each column of the polar coordinate image) may represent a scanning stage. Points (pixels) on the radial lines may represent candidate points at different scanning stages to determine the endocardial boundary or the epicardial boundary of the myocardium. The dual dynamic programming operation may be performed on the polar coordinate images to find an optimal path with a minimum accumulated cost. Thus, the endocardium and epicardium of the myocardium of the left ventricle may be segmented accordingly.

The accumulated cost may include an internal cost ($cost_{int}$) and an external cost ($cost_{ext}$). The internal cost "$cost_{int}$" may represent the smoothness of two paths of the endocardial boundary and the epicardial boundary in the polar coordinate image. The external cost "$cost_{ext}$" may represent the gradient of the change of intensity of pixels of two paths of the endocardial boundary and the epicardial boundary in the polar coordinate image.

The internal $cost_{int}$ may be expressed as Equation 1:

$$cost_{int} = |y_i^{endo} - y_{i-1}^{endo}|/y_{range} + |y_i^{epi} - y_{i-1}^{epi}|/y_{range} + |d_i^{myo} - d_{i-1}^{myo}|/d_{range}. \quad \text{(Equation 1)}$$

The first term $|y_i^{endo} - y_{i-1}^{endo}|/y_{range}$ of Equation 1 may represent a normalized distance along a vertical direction of the candidate points on the endocardial boundary (also referred to as the endocardial candidate points (pixels)) of adjacent columns (e.g., the $i^{th}$ column, and the $(i-1)^{th}$ column). The second term $|y_i^{epi} - y_{i-1}^{epi}|/y_{range}$ of Equation 1 may represent a normalized distance along a vertical direction of candidate points on the epicardial boundary (also referred to herein as the epicardial candidate points (pixels)) of adjacent columns (e.g., the $i^{th}$ column, and the $(i-1)^{th}$ column). The third term $|d_i^{myo} - d_{i-1}^{myo}|/d_{range}$ of Equation 1 may represent a normalized myocardial thickness determined by the endocardial candidate points (pixels) and epicardial candidate points (pixels) of adjacent columns (e.g., the $i^{th}$ column, and the $(i-1)^{th}$ column).

In Equation 1, $y_i^{endo}$ may denote vertical positions in the $i^{th}$ column of the candidate points (pixels) on the endocardial boundary in the polar coordinate image; $y_{i-1}^{endo}$ may denote vertical positions in the $(i-1)^{th}$ column of the candidate points (pixels) on the endocardial boundary in the polar coordinate image; $y_i^{epi}$ may denote vertical positions in the $i^{th}$ column of the candidate points (pixels) on the epicardial boundary in the polar coordinate image; $y_{i-1}^{epi}$ may denote vertical positions in the $(i-1)^{th}$ column of the candidate points (pixels) on the epicardial boundary in the polar coordinate image; $y_{range}$ may denote a maximum distance (e.g., three pixels) in two adjacent columns between two candidate points (pixels) on the endocardial boundary in the polar coordinate image; $d_{range}$ may denote a maximum thickness of the myocardium (e.g., five pixels) in two adjacent columns in the polar coordinate image.

The external $cost_{ext}$ may be expressed as Equation 2:

$$cost_{ext} = -G_i^{endo}/\max G^{endo} - G_i^{epi}/\max G^{epi}. \quad \text{(Equation 2)}$$

In Equation 2, $G_i^{endo}$ may represent a gradient for the candidate points on the endocardial boundary (points or pixels on the $i^{th}$ column) obtained from an original polar coordinate image; $G_i^{epi}$ may represent a gradient for the candidate points on the epicardial boundary (points or pixels on the $i^{th}$ column) obtained from an enhanced polar coordinate image (e.g., obtained based on a statistical distribution of gray values of the myocardium in the slice images at different time phases); and max $G^{endo}$ and max $G^{epi}$ may denote the maximum gradient values for the original and the enhanced polar coordinate images, respectively.

In 470, the polar coordinate image including the determined endocardial and epicardial boundaries may be transformed into a Cartesian coordinate image, a slice image at the end-diastolic phase in which the endocardium and the epicardium are segmented. The transformation may be performed by the processor 240 (e.g., the image transformation module 318).

It should be noted that process 400 described above is provided for the purposes of illustration, and not intended to limit the scope of the present disclosure. Apparently for persons having ordinary skills in the art, numerous variations and modifications may be conducted under the teaching of the present disclosure. However, those variations and modifications do not depart the protection scope of the present disclosure. In some embodiments, some operations may be optional. For example, 420, 430, and/or 440 may be omitted.

FIG. 5 illustrates a flowchart of an exemplary process 500 for determining the end-diastolic phase according to some embodiments of the present disclosure. In 510, a number of mid-ventricular slice images ($I_{MP}$) at a plurality of time phases in a cardiac cycle may be obtained. In some embodiments, the operation may be performed by the processor 240 (e.g., the image acquisition module 302).

In 520, an initial region of interest ($ROI_0$) may be determined in each of the mid-ventricular slice images $I_{MP}$. The $ROI_0$ of a mid-ventricular slice images $I_{MP}$ may have a center point coinciding with a center point of the mid-ventricular slice image $I_{MP}$. The $ROI_0$ may have a radius of several pixels. For example, a dimension of the radius may be between sixty and one hundred and twenty pixels. As one example, the dimension of the radius may be one hundred pixels. In some embodiments, the operation may be performed by the processor 240 (e.g., the time phase determination module 304).

In 530, a maximum intensity projection (MIP) image of the $ROI_0$ across the plurality of time phases in the cardiac cycle may be determined.

In 540, a clustering operation may be performed on the MIP image to obtain one or more projection clusters. The clustering operation may be based on, for example, a Fuzzy c-mean clustering algorithm. The clustering operation may be performed by the processor 240 (e.g., the cluster module 308).

Figure 10B:
FIG. 10B illustrates an exemplary maximum intensity projection image in the initial region of interest according to some embodiments of the present disclosure.
Figure 10C:
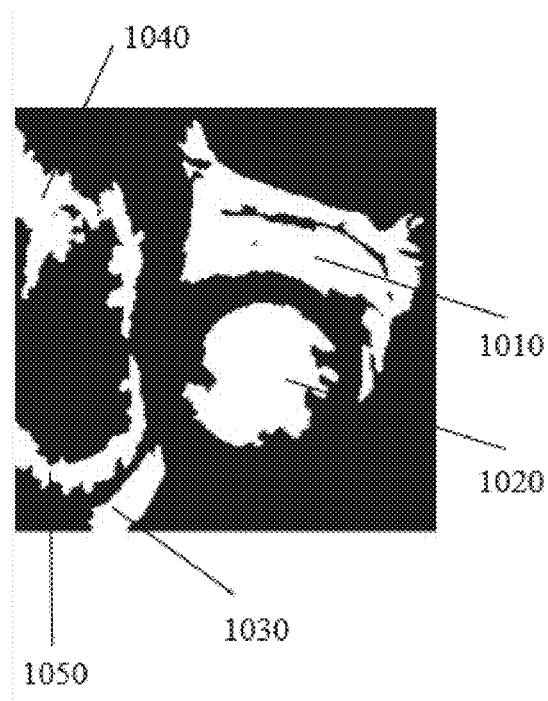
FIG. 10C illustrates an exemplary binary image of the maximum intensity projection image obtained according to the Fuzzy c-means clustering algorithm according to some embodiments of the present disclosure.

In 550, one or more connection regions may be identified based on the projection clusters obtained in 540 (e.g., 1010, 1020, 1030, 1040, or 1050, as shown in FIG. 10C). Further, the roundness of each of the connection regions may be determined. The identification of the connection regions may be performed in the processor 240. Then, the connection region with the largest roundness (also referred to herein as a largest roundness connection region) may be identified from the one or more connection regions. The roundness may be defined by following formula: $4\pi S/Q^2$, in which "S" is the area of the connection region, and "Q" is the perimeter of the connection region in a binary image obtained by performing the clustering method on the MIP image. In some embodiments, the MIP image after the clustering operation may include a number of clusters between two and ten, e.g., two clusters, three clusters, and four clusters, etc.

In 560, a mean gray value of a portion of each of the mid-ventricular slice images $I_{MP}$ at different time phases corresponding to the largest roundness connection region (area "A") may be determined. The determination of the mean gray value may be performed by the processor 240 (e.g., the gray value determination module 306).

In 570, the mid-ventricular slice image having the maximum mean gray value may be determined as the mid-ventricular slice image $I_{MP(ED)}$ at an end-diastolic phase/period (also referred to herein as the first slice image at the end-diastolic phase). The time phase corresponding to the mid-ventricular slice image with the maximum mean gray value may be determined as the end-diastolic phase/period. The determination of the end-diastolic phase/period and the determination of the mid-ventricular slice image at the end-diastolic phase may be performed by the processor 240 (e.g., the time phase determination module 304).

FIG. 6 illustrates a flowchart of an exemplary process 600 for segmenting a blood pool region according to some embodiments of the present disclosure. In 610, the mid-ventricular slice image $I_{MP(ED)}$ at the end-diastolic phase (or the region of interest of $I_{MP(ED)}$) may be corrected based on a correction algorithm including, e.g., Gamma correction. The corrected slice image $I_{MP(ED)}'$ may be obtained accordingly. The Gamma correction may be performed to enhance the contrast of the blood pool region and the myocardium. It may also facilitate subsequent processing including, for example, identification and segmentation. The correction may be performed by the processor 240 (e.g., the image correction module 310).

In 620, a clustering operation may be performed on the corrected image $I_{MP(ED)}'$ to identify clusters of areas. The operation may be performed by the processor 240 (e.g., the cluster module 308). The clustering operation may be based on, for example, a Fuzzy c-means clustering algorithm (FCM). In some embodiments, the clusters of areas may include a number of clusters, e.g., between one and ten clusters. Merely by way of example, the number of the clusters may include two.

In 630, the brightness of each of the clusters may be determined. In 640, a cluster having a highest brightness may be identified. Then in 650, areas belonging the cluster having the highest brightness may be determined as candidate areas $S_M$.

In 660, for each of the candidate areas $S_M$, an overlapping area where the candidate area overlaps the largest roundness connection region (area "A") may be identified. Further, a candidate area $S_M$ with the largest overlapping area with the largest roundness connection region (area "A") may be designated as the blood pool region in the mid-ventricular slice image at the end-diastolic phase. "M" denotes the ordinal of the mid-ventricular slice image. The blood pool region in the mid-ventricular slice image at the end-diastolic phase may thus be segmented. The segmentation of the blood pool region may be performed by the processor 240 (e.g., the image segmentation module 320).

In 670, blood pool regions in other slice images at the end-diastolic phase (also referred to herein as second slice images at the end-diastolic phase) than a mid-ventricular slice image at the end-diastolic phase may be segmented based on the segmentation of the blood pool region in the mid-ventricular slice image at the end-diastolic phase (the first slice image at the end-diastolic phase). In some embodiments, the operation may be performed by the processor 240 (e.g., the image segmentation module 302). In some embodiments, the segmented blood pool region in the mid-ventricular slice image at the end-diastolic phase may be used as guidance to segment the blood pool regions in the second slice images at the end-diastolic phase. For example, blood pool regions in the $1^{st}$ slice image through the $(M-1)^{th}$ slice image at the end-diastolic phase may be segmented accordingly. Blood pool regions in the $(M+1)^{th}$ slice image through the $N^{th}$ slice image at the end-diastolic phase may be segmented accordingly. A segmented blood pool region in a slice image at the end-diastolic phase may be utilized as guidance for segmenting the blood pool region in a slice image at the end-diastolic phase.

Merely by way of example, the $M^{th}$ slice image may be designated as the prior slice image. The $(M-1)^{th}$ slice image or the $(M+1)^{th}$ slice image may be designated as the current slice image. The $(M-1)^{th}$ slice image or the $(M+1)^{th}$ slice image may be regarded as a prior slice image with respect to the $(M-2)^{th}$ slice image or the $(M+2)^{th}$ slice image, and so on.

Merely by way of example, firstly, a blood pool region of the $M^{th}$ slice image at the end-diastolic phase may be segmented, and a blood pool region of the $(M-1)^{th}$ slice image at the end-diastolic phase may be segmented based on the segmented blood pool region in the $M^{th}$ slice image at the end-diastolic phase. Then, a blood pool region of the $(M-2)^{th}$ slice image at the end-diastolic phase may be segmented based on the segmented blood pool region in the $(M-1)^{th}$ slice image at the end-diastolic phase. The process may be repeated. In addition, a blood pool region of the $(M+1)^{th}$ slice image at the end-diastolic phase may be segmented based on the segmented blood pool region in the $M^{th}$ slice image at the end-diastolic phase. A blood pool region in the $(M+2)^{th}$ slice image at the end-diastolic phase may be segmented based on the segmented blood pool region in the $(M+1)^{th}$ slice image at the end-diastolic phase. The process may be repeated.

Merely by way of example, the blood pool regions in the second slice images at the end-diastolic phase may be segmented as follows.

The $(K-1)^{th}$ slice image at the end-diastolic phase $I_{(K-1)P(ED)}$ or the $(K+1)^{th}$ slice image at the end-diastolic phase $I_{(K+1)P(ED)}$ may be regarded as a current slice image, and the $K^{th}$ slice image at the end-diastolic phase $I_{KP(ED)}$ may be regarded as a prior slice image. A blood pool region in the prior slice image (the $K^{th}$ slice image) at the end-diastolic phase may be segmented. A blood pool region in the current slice image (the $(K-1)^{th}$ slice image or the $(K+1)^{th}$ slice image) at the end-diastolic phase may be segmented based on the segmented blood pool region in the current slice image.

Furthermore, a region of interest (ROI) in the current slice image $I_{(K-1)P(ED)}$ or $I_{(K+1)P(ED)}$ may have a center (centroid) coinciding with the centroid of the segmented blood pool region in the prior slice image $I_{KP(ED)}$. In some embodiments, the ROI of the current slice image may have a shape of a square, a triangle, a rectangle, a parallelogram, a circle, etc. The length of the shape may refer to the longest dimension of the shape. The length of the ROI may be longer than the length of the long axis of the prior slice image. As one example, the length of the ROI may be longer than the length of the long axis of the prior slice image by several pixels, e.g., between ten pixels and fifty pixels. In some embodiments, the length of the ROI may be longer than the length of the long axis of the prior slice image by five pixels, ten pixels, fifteen pixels, twenty pixels, twenty-five pixels, thirty, thirty-five pixels, forty pixels, etc. In some embodiments, the ROI of the current slice image $I_{(K-1)P(ED)}$ or $I_{(K+1)P(ED)}$ at the end-diastolic phase may be further processed based on Gamma correction. A corrected image $I_{(K-1)P(ED)}'$ or $I_{(K+1)P(ED)}'$ may be obtained accordingly.

The Fuzzy c-means clustering (FCM) algorithm may then be applied to the corrected images $I_{(K+1)P(ED)}'$ or $I_{(K-1)P(ED)}'$ to obtain clusters of areas. Merely by way of example, the clusters of areas may include a number of clusters, e.g., between two and ten clusters. In some embodiments, the number of the clusters may include two, three, four, five, etc. The brightness of each of the clusters may be determined. A cluster having the highest brightness may then be identified. Areas belonging the cluster having the highest brightness may be designated as candidate areas $S_{(k+1)}$ or $S_{(k-1)}$.

The candidate areas $S_{(K-1)}$ or $S_{(K+1)}$ with the largest overlapping area with the segmented blood pool region in the prior slice image $I_{KP(ED)}$ may be designated as the segmented blood pool region in the current slice image at the end-diastolic phase. "K" may denote an ordinal number of the slice images. K may be equal to M, larger than M, or smaller than M.

Furthermore, the length of the long axis of the segmented blood pool region in the current slice image $I_{(K-1)P(ED)}$ or $I_{(K+1)P(ED)}$ may be compared with the length of the long axis of the segmented blood pool region of the prior slice image $I_{KP(ED)}$. In some embodiments, if a difference (e.g., ratio) therebetween is larger than a threshold (e.g., 1.2 times), it may be deemed that a left ventricular outflow tract (LVOT) occurs. In some embodiments, a length-width ratio of the segmented blood pool region in the current slice image may be compared with a length-width ratio of the segmented blood pool region in the prior slice image. If a difference (e.g., ratio) therebetween is larger than a threshold (e.g., 1.3 times), it may be deemed that a LVOT occurs. The current slice may be a slice before the mid-ventricular slice (e.g., one slice closer to the basal slice than the mid-ventricular slice).

Furthermore, if the LVOT occurs, parameters used on the Gamma correction may be adjusted. Then, the ROI of the current slice image may be processed by the adjusted Gamma correction again to obtain a corrected image. The Fuzzy c-means clustering (FCM) algorithm may then be employed to segment the blood pool region of the corrected image.

Furthermore, if the LVOT still occurs after the aforementioned processing, a ray-scanning approach may be employed to remove an over-segmented portion of the segmented blood pool region in the current slice image. The over-segmented portion may refer to a region that may not belong to a blood pool region.

Figure 7:
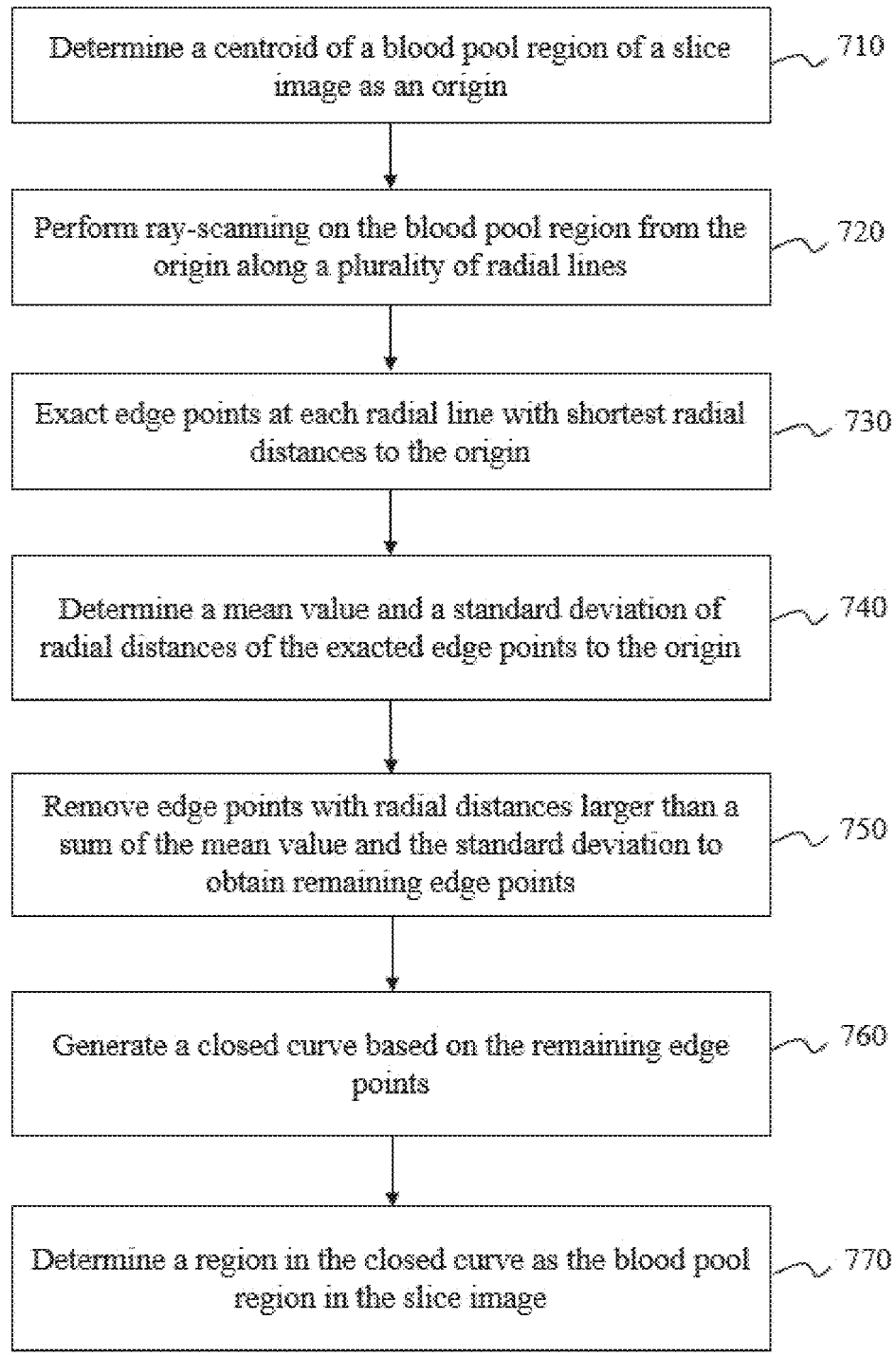
FIG. 7 illustrates a flowchart of an exemplary process 700 for segmenting a blood pool region according to some embodiments of the present disclosure.

FIG. 7 illustrates an exemplary process 700 for segmenting a blood pool region based on the ray-scanning approach.

In 710, a centroid (e.g., point "a" in FIG. 11A) of the segmented blood pool region with an over-segmented portion of a current slice image may be determined as an origin.

In 720, ray-scanning may be performed on the blood pool region with the over-segmented portion from the origin along a plurality of radial lines. The plurality of radial lines may be along different directions (angles) from the origin.

In 730, edge points (pixels) of the segmented blood pool region with the over-segmented portion in the current slice image may be extracted. Edge point(s) at each radial line with the shortest radial distances to the origin may also be identified, e.g. points b1, b2, and b3 in FIG. 11A. The extraction and identification of the edge points may be performed by the processor 240 (e.g., the point processing module 312).

In 740, a mean value and a standard deviation of the radial distances of the identified edge points to the origin may be respectively determined. It should be noted that another average value of the radial distance, e.g., a weighted mean value, etc., may be used.

In 750, the identified edge point(s) may be filtered by removing edge point(s) whose radial distances is/are larger than the sum of the mean value and the standard deviation to obtain remaining or filtered edge points. For example, the edge point(s) (e.g., b3 in FIG. 11A) to the origin with a radial distance larger than a sum of the mean value and the standard deviation is removed, and edge points (e.g. b1, b2) are retained. The operation may be performed by the processor 240 (e.g., the point processing module 312).

In 760, a closed curve may be generated based on the remaining edge points. In some embodiments, the remaining edge points may be interpolated and fitted to obtain the closed curve. The operation may be performed by the processor 240 (e.g., the boundary determination module 314).

In 770, a corresponding region in the closed curve may be determined as a segmented blood pool region of the current slice image. The operation may be performed by the processor 240 (e.g., image segmentation module 320).

FIG. 8 illustrates a flowchart of an exemplary process 800 for segmenting the epicardium and the endocardium of a left ventricle in accordance with some embodiments of the present disclosure. In some embodiments, at least part of process 800 may be performed by processor 240. The process 800 may include the following operations.

In 810, a plurality of slice images (e.g. MR images) of a myocardium of a left ventricle at a plurality of time phases in a cardiac cycle may be obtained.

In 820, an end-diastolic phase may be determined from the plurality of time phases.

In 830, a region of interest in each of the slice images at the end-diastolic phase may be obtained.

In 840, a blood pool region in the region of interest in each of the slice images at the end-diastolic phase may be segmented.

In 850, the region of interest with the (segmented) blood pool region in each of the slice image may be transformed into a polar coordinate image.

In 860, a dual dynamic programming operation may be performed on the polar coordinate image to determine endocardial and epicardial boundaries of the myocardium in the each of the polar coordinate images at the end-diastolic phase.

In 870, endocardial and epicardial boundaries of the myocardium in the slice images at the time phases other than the end-diastolic phase may be determined, based on the endocardial and epicardial boundaries of the myocardium in the polar coordinate images at the end-diastolic phase. The endocardium and epicardium of the myocardium in the mid-ventricular slice image at the end-diastolic phase may thus be segmented. The segmentation may be performed by the processor 240 (e.g., the image segmentation module 320).

In 880, the polar coordinate image(s) including endocardial and epicardial boundaries may be transformed into Cartesian coordinate image(s) to obtain the endocardial and epicardial boundaries of the myocardium in each of the slice images. In some embodiments, the endocardial and epicardial boundaries of the myocardium of the left ventricle (LV) may further be convex-hulled and/or smoothed to obtain the endocardium and epicardium of the myocardium of the left ventricle. The operation may be performed by the processor 240.

Operations 810-860 may be respectively performed similarly to 410-460, and 880 may be performed similarly to 470. FIG. 9 illustrates an exemplary process for 870.

It should be noted that process 800 described above is provided for the purposes of illustration, and not intended to limit the scope of the present disclosure. Apparently for persons having ordinary skills in the art, numerous variations and modifications may be conducted under the teaching of the present disclosure. However, those variations and modifications do not depart the protection scope of the present disclosure. In some embodiments, some operations may be optional. For example, 820, 830, and/or 840 may be omitted. In some embodiments, the order of some operations may be changed. For example, 870 may be performed before 860. Similar modifications should fall within the scope of the present disclosure.

FIG. 9 illustrates a flowchart of exemplary process 900 for segmenting the endocardium and the epicardium of a myocardium of a left ventricle in the slice images at the time phases other than the end-diastolic phase according to some embodiments of the present disclosure. In 910, a $K^{th}$ slice image at a $L^{th}$ time phase may be regarded as a current (time phase) slice image $I_{KL}$, and a $K^{th}$ slice image at a $(L-1)^{th}$ time phase may be regarded as a prior (time phase) slice image $I_{K(L-1)}$. The endocardial and epicardial boundaries of the polar coordinate image at the prior time phase may be determined as described elsewhere in the present disclosure. The centroid of the blood pool region in the prior slice image may be determined as an origin of the ray scanning for the current (time phase) slice image $I_{KL}$. The operation may be performed by the processor 240 (e.g., the image acquisition module 302).

In 920, the current slice image $I_{KL}$ may be transformed into a polar coordinate image $P_{KL}$, which may be disposed near the endocardial and epicardial boundaries of the polar coordinate image already segmented from the prior slice image $I_{K(L-1)}$. The operation may be performed by the processor 240 (e.g., the image transformation module 318).

In 930, a gray value distribution of the slice images of the myocardium from the end-diastolic phase to the prior time phase ($(L-1)^{th}$ time phase) in a same cardiac cycle may be determined. The operation may be determined by the processor 240 (e.g., the gray value determination module 306).

In 940, the current (time phase) slice image $I_{KL}$ may be enhanced. In some embodiments, a gray value of a pixel in the $K^{th}$ slice image (the current slice image) at the $L^{th}$ time phase may be multiplied by the value of the gray value distribution of the corresponding pixel to obtain an enhanced current (time phase) slice image. The operation may be performed by the processor 240 (e.g., the image enhancement module 316).

In 950, the enhanced current (time phase) slice image (enhanced $I_{KL}$) of the myocardium may be transformed into a polar coordinate image $P_{card}$. The operation may be performed by the processor 240 (e.g., the image transformation module 318).

In 960, a dual dynamic programming operation may be performed on the polar coordinate images $P_{KL}$ and $P_{card}$ together to find optimal curves of the endocardial and epicardial boundaries of the myocardium of the left ventricle (LV) in both polar coordinate images $P_{KL}$ and $P_{card}$, respectively. The operation may be performed by the processor 240 (e.g., the image segmentation module 320). The searching of the endocardial and epicardial boundaries within the polar coordinate images $P_{KL}$ and $P_{card}$ at the current time phase (the $L^{th}$ time phase) may be performed in a region restricted by the endocardial and epicardial boundaries at the prior time phase (the $(L-1)^{th}$ time phase).

In some embodiments, the endocardial and epicardial boundaries in the current and/or prior slice image of the myocardium of the left ventricle (LV) may further be convex-hulled and/or smoothed to obtain the endocardium and epicardium of the myocardium of the left ventricle.

Merely by way of example, the searching of the endocardial and epicardial boundaries of the slice images at the current time phase may be performed in a region constrained between twenty pixels above the endocardial boundaries and ten pixels below the epicardial boundaries of the slice images at the prior time phase.

It should be noted that process 900 described above is provided for the purposes of illustration, and not intended to limit the scope of the present disclosure. Apparently for persons having ordinary skills in the art, numerous variations and modifications may be conducted under the teaching of the present disclosure. However, those variations and modifications do not depart the protection scope of the present disclosure. In some embodiments, some operations may be optional. For example, 940 may be omitted. Similar modifications should fall within the scope of the present disclosure.

EXAMPLES

The following examples are provided for illustration purposes, and not intended to limit the scope of the present disclosure.

Example 1

Figure 10D:
FIG. 10D illustrates an exemplary blood pool region segmentation result shown in the region of interest according to some embodiments of the present disclosure.

FIG. 10A illustrates a mid-ventricular slice image of a part of a myocardium of a left ventricle at one time phase. The slice image includes an initial region of interest (ROI). The ROI includes a blood pool region. Then the maximum intensity projection image of the ROI was obtained as shown in FIG. 10B. A clustering operation based on the Fuzzy-c mean clustering algorithm was performed on the maximum intensity projection image of the ROI, and a binary image was obtained as shown in FIG. 10C. In the binary image, several connection regions were identified, e.g., 1010, 1020, 1030, 1040, 1050, etc. The roundness of each connection region was determined. The connection region with the largest roundness (1020 in FIG. 10C) was determined as the largest roundness connection region (area "A"). Based on the largest roundness connection region (1020 in FIG. 10C), the blood pool region on the MIP image of the mid-ventricle slice image was determined as shown in FIG. 10D.

Example 2

Figure 11A:
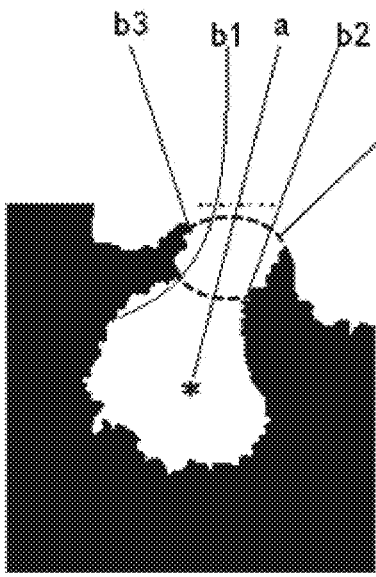
FIG. 11A through FIG. 11C illustrate exemplary diagrams of blood pool region segmentation according to some embodiments of the present disclosure.
Figure 11B:
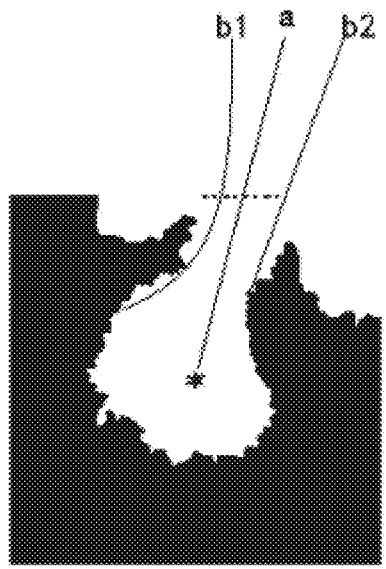
Figure 11C:
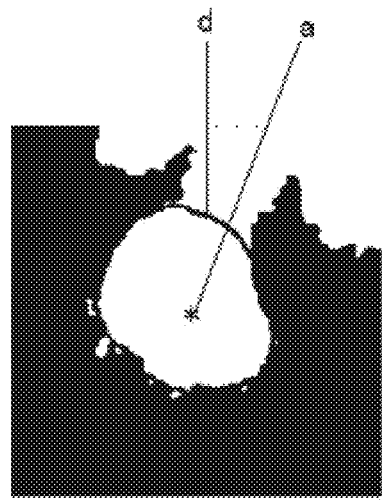

FIG. 11A through FIG. 11C illustrate exemplary diagrams of segmentation of a blood pool region in a slice image when the LVOT occurs. As shown in FIG. 11A, a centroid (e.g. point "a") of the segmented blood pool region with an over-segmented portion 1110 of a slice image was determined as an origin. Then, ray-scanning was performed on the blood pool region with the over-segmented portion 1110 from the origin along a plurality of radial lines. The plurality of radial lines were along different directions (angles) from the origin. Edge points (pixels) of the segmented blood pool region with the over-segmented portion 1110 in the slice image was extracted. Edge point(s) at each radial line with the shortest radial distance to the origin was also selected, e.g., points b1, b2, or b3 in FIG. 11A.

Then, a mean value and a standard deviation of the radial distances of the selected edge points to the origin was respectively determined. Edge point(s) with radial distances larger than the sum of the mean value and the standard deviation were removed to obtain remaining edge points. For example, the edge point(s) (e.g. b3) to the origin with a radial distance larger than the sum of the mean value and the standard deviation was removed, and edge points (e.g. b1, b2) were retained.

Then, a closed curve (the curve "d" in FIG. 11C) was generated based on the remaining edge points through interpolating and fitting of the remaining edge points. The region in the closed curve was determined as the segmented blood pool region of the slice image.

Example 3

Figures 12A, 12B, 12C, 12D, 12E:
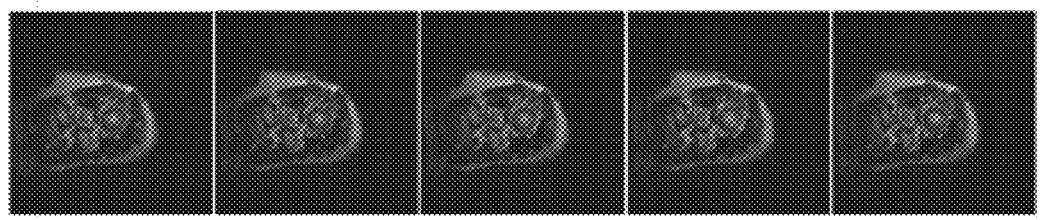
FIG. 12A through FIG. 12O illustrate exemplary segmentation results of an epicardium and an endocardium in three representative slice images at five time phases.
Figures 12F, 12G, 12H, 12I, 12J:
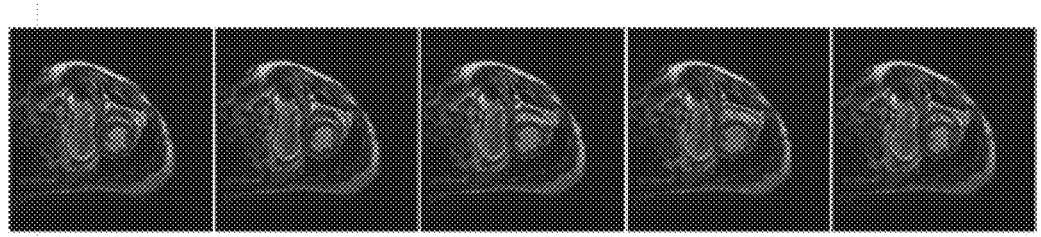
Figures 12K, 12L, 12M, 12N, 12O:
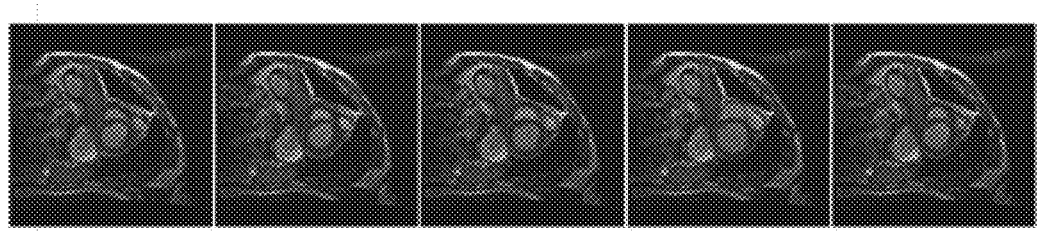

FIG. 12A through FIG. 12O illustrate segmentation results of the epicardium and endocardium of the myocardium of a left ventricle in three representative slice images (a slice image-1, a slice image-2, a slice image-3) at five time phases (a time phase-1, a time phase-2, a time phase-3, a time phase-4, and a time phase-5). As used herein, the slice image-1 refers to an image at a first slice in terms of location; the slice image-2 refers to an image at a second slice in terms of location; the slice image-3 refers to an image at a third slice in terms of location.

FIG. 12A through FIG. 12E illustrate the segmentation results of the epicardium and endocardium of the myocardium of the left ventricle in the slice image-1 at the five time phases. FIG. 12F through FIG. 12J illustrate the segmentation results of the epicardium and endocardium of the myocardium of the left ventricle in the slice image-2 at the five time phases. FIG. 12L through FIG. 12O illustrate the segmentation results of the epicardium and endocardium of the myocardium of the left ventricle in the slice image-3 at the five time phases. The segmentation results shown in FIG. 12A through FIG. 12O were obtained through the processes illustrated in FIG. 4 through FIG. 9. As shown in FIG. 12A through FIG. 12O, the epicardium and endocardium of the myocardium in each of the slice images at each of the time phases can be recognized.

Example 4

In this study, 9 clinical short axis (SA) cardiac cine MR images were obtained from Ruijin Hospital of Shanghai Jiaotong University to develop and evaluate an automated scheme. All MR images were acquired under one 1.5-T MR scanner. Each cardiac cine MR images included 10-15 slices (sections) for the coverage of LV, and 20 time phases throughout a cardiac cycle. The pixel size in x, y axis was 0.8-0.9 mm with the matrix size of 512×512, and the pixel size in z axis was 8 mm. Typical parameters of TR, TE, and flip angle were 4.29 ms, 1.86 ms, and 45 degrees, respectively. The segmentation performance of 2020 slice images was subjectively evaluated in corresponding dataset by use of three scores. A score "3" may indicate a good result that (almost) does not need manual revision; a score "2" may indicate an acceptable result that needs minor manual revision; and a score "1" may indicate a poor segmentation result that may not be used in clinical practice. Table 1 shows the number and the percentage of the evaluated slices with respect to the three scores. The results show that based on the method disclosed herein, 90.5% of 2020 slice images were segmented automatically with the score of 2 or 3, for which none or minor manual revision was needed.

TABLE 1

Segmentation performance by subjective evaluation with respect to the three scores

|  | Score "1" | Score "2" | Score "3" |
| --- | --- | --- | --- |
| Number | 192 | 243 | 1585 |
| Percentage | 9.5% | 12% | 78.5% |

Furthermore, the segmentation result of the endocardium and epicardium may be used for quantitative analysis of global and regional measurements, such as ventricle volumes, ejection fraction, and wall thickness, which could help the radiologists improve the accuracy and efficiency of heart function evaluation.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method implemented on at least one machine each of which has at least one processor and storage, the method comprising:
   obtaining a plurality of slice images of a myocardium of a left ventricle at a plurality of time phases in a cardiac cycle;
   selecting mid-ventricular slice images at the plurality of time phases;
   determining an initial region of interest in each of the mid-ventricular slice images;

obtaining a maximum intensity projection image of the initial region of interest for the mid-ventricular slice images;

identifying, from the maximum intensity projection image, a connection region with the largest roundness;

determining a mean gray value of each of the mid-ventricular slice images in the connected region with the largest roundness; and designating a time phase corresponding to one of the mid-ventricular slice images with a maximum mean gray value as the end-diastolic phase.

2. The method of claim 1, wherein the identifying a connection region with the largest roundness comprises:

performing a clustering operation on the maximum intensity projection image to obtain projection clusters;

identifying, based on the clustering operation, connection regions from the projection clusters;

determining roundness of each of the connection regions; and identifying, from the connection regions, the connection region with the largest roundness.

3. The method of claim 1, further comprising:

retrieving, from the plurality of slice images, a first slice image at the end-diastolic phase;

obtaining a region of interest in the first slice image at the end-diastolic phase;

segmenting a blood pool region in the region of interest in the first slice image at the end-diastolic phase.

4. The method of claim 3, wherein a center of the region of interest coincides with a centroid of the connection region with the largest roundness.

5. The method of claim 3, wherein a length of the region of interest is longer than a length of a long axis of the connection region with the largest roundness.

6. The method of claim 3, wherein the obtaining a region of interest in the first slice image at the end-diastolic phase comprises obtaining the region of interest in the mid-ventricular slice image at the end-diastolic phase.

7. The method of claim 6, further comprising:

performing Gamma correction on the region of interest in the mid-ventricular slice image at the end-diastolic phase to obtain a corrected image.

8. The method of claim 7, further comprising:

performing a Fuzzy c-means clustering operation on the corrected image to obtain clusters of areas;

determining brightness of each of the clusters;

identifying, among the clusters of areas, a cluster having the highest brightness; and designating areas belonging the cluster having the highest brightness as candidate areas.

9. The method of claim 8, wherein the segmenting a blood pool region in the region of interest comprises:

for each of the candidate areas, determining an overlapping area where the candidate area overlaps the connection region with the largest roundness; and designating the candidate area with the largest overlapping area among the determined overlapping areas as the blood pool region in the mid-ventricular slice image at the end-diastolic phase.

10. The method of claim 6, further comprising:

obtaining a region of interest in a second slice image at the end-diastolic phase other than the mid-ventricular slice image at the end-diastolic phase; and segmenting a blood pool region in the region of interest in the second slice image at the end-diastolic phase.

11. The method of claim 10, wherein the segmenting a blood pool region in the region of interest in the mid-ventricular slice image at the end-diastolic phase and the segmenting a blood pool region in the region of interest of the second slice image at the end-diastolic phase are performed in an order from the mid-ventricular slice image at the end-diastolic phase to an apical slice image at the end-diastolic phase.

12. The method of claim 10, wherein the segmenting a blood pool region in the region of interest of the mid-ventricular slice image at the end-diastolic phase and the segmenting a blood pool region in the region of interest in the second slice image at the end-diastolic phase are performed in an order from the mid-ventricular slice image at the end-diastolic phase to a basal slice image at the end-diastolic phase.

13. The method of claim 3, further comprising:

transforming the region of interest in the first slice image at the end-diastolic phase into a polar coordinate image;

performing a dual dynamic programming operation on the polar coordinate image to determine endocardial and epicardial boundaries of the myocardium in the polar coordinate image; and transforming the polar coordinate image into a Cartesian coordinate image to obtain the endocardial and epicardial boundaries of the myocardium in the first slice image at the end-diastolic phase.

14. The method of claim 1, wherein the obtaining a plurality of slice images of a myocardium of a left ventricle at a plurality of time phases in a cardiac cycle comprises:

scanning the left ventricle at the plurality of time phases.

15. A system comprising:

at least one processor and at least one storage device including instructions that, when executed by the at least one processor, cause the at least one processor to effectuate operations comprising:

obtaining a plurality of slice images of a myocardium of a left ventricle at a plurality of time phases in a cardiac cycle;

selecting mid-ventricular slice images at the plurality of time phases;

determining an initial region of interest in each of the mid-ventricular slice images;

obtaining a maximum intensity projection image of the initial region of interest for the mid-ventricular slice images;

identifying, from the maximum intensity projection image, a connection region with the largest roundness;

determining a mean gray value of each of the mid-ventricular slice images in the connected region with the largest roundness; and determining the end-diastolic phase, based on a time phase corresponding to one of the mid-ventricular slice images with a maximum mean gray value.

16. The system of claim 15, wherein the identifying a connection region with the largest roundness comprises:

performing a clustering operation on the maximum intensity projection image to obtain projection clusters;

identifying, based on the clustering operation, connection regions from the projection clusters;

determining roundness of each of the connection regions; and identifying, from the connection regions, the connection region with the largest roundness.

17. The system of claim 15, wherein the at least one processor is caused to effectuate additional operations comprising:

retrieving, from the plurality of slice images, a first slice image at the end-diastolic phase;

obtaining a region of interest in the first slice image at the end-diastolic phase;

segmenting a blood pool region in the region of interest in the first slice image at the end-diastolic phase.

18. The system of claim 17, wherein a center of the region of interest coincides with a centroid of the connection region with the largest roundness.

19. The system of claim 17, wherein a length of the region of interest is longer than a length of a long axis of the connection region with the largest roundness.

20. The system of claim 17, wherein the at least one processor is caused effectuate additional operations comprising:

transforming the region of interest in the first slice image at the end-diastolic phase into a polar coordinate image;

performing a dual dynamic programming operation on the polar coordinate image to determine endocardial and epicardial boundaries of the myocardium in the polar coordinate image; and transforming the polar coordinate image into a Cartesian coordinate image to obtain the endocardial and epicardial boundaries of the myocardium in the first slice image at the end-diastolic phase.

* * * * *